Figure 1:
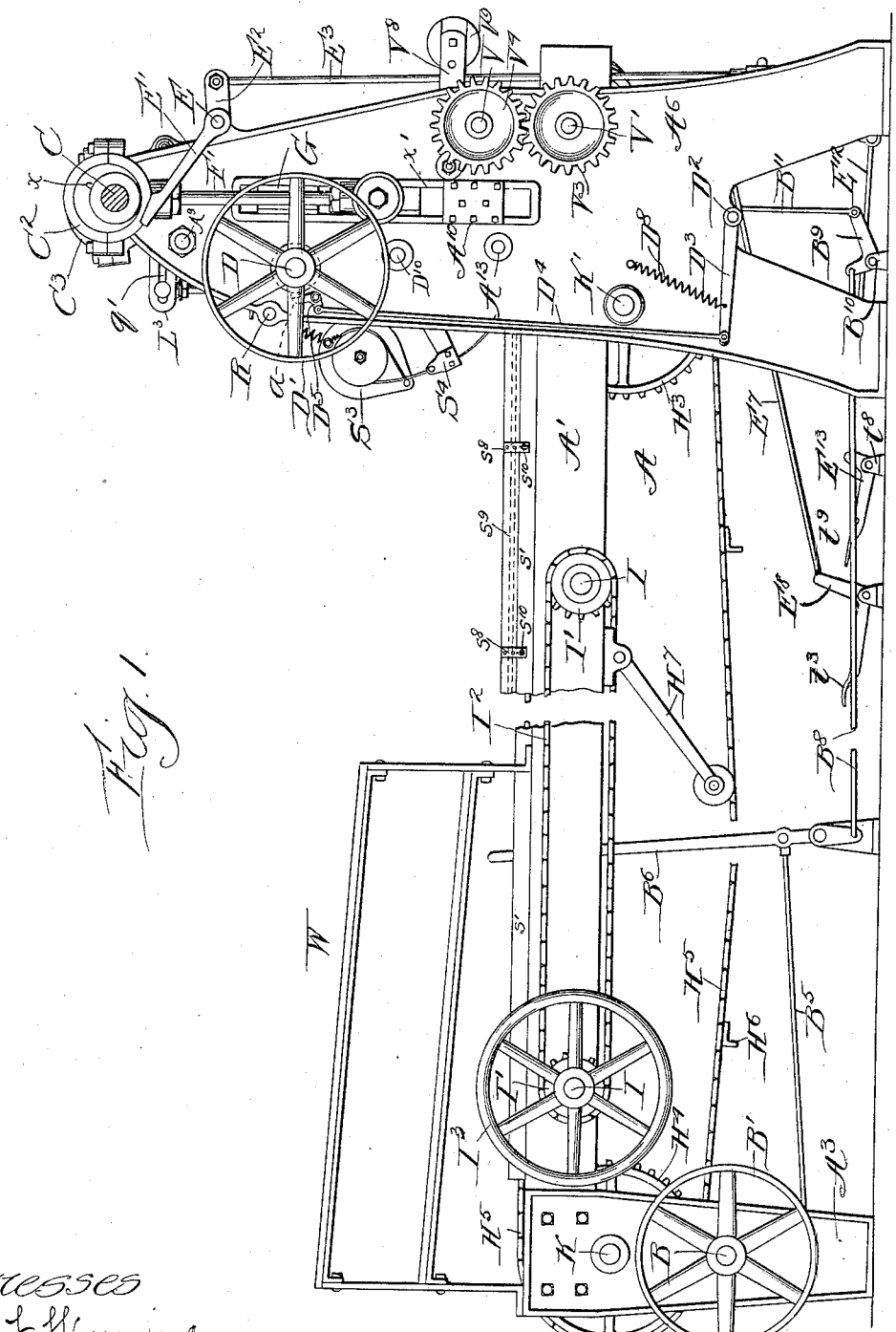

No. 608,796. Patented Aug. 9, 1898.
F. P. ROSBACK.
MACHINE FOR MAKING BOX BLANKS.
(Application filed Nov. 27, 1896.)
(No Model.) 14 Sheets—Sheet 1.

Witnesses
Wm. F. Henning
Wm. N. Rheem

Inventor:
Frederick P. Rosback,
by Dyrenforth & Dyrenforth,
Attys.

THE NORRIS PETERS CO., PHOTO-LITHO., WASHINGTON, D. C.

No. 608,796. Patented Aug. 9, 1898.
F. P. ROSBACK.
MACHINE FOR MAKING BOX BLANKS.
(Application filed Nov. 27, 1896.)

(No Model.) 14 Sheets—Sheet 4.

Fig. 4.

Witnesses
Wm. F. Henning
Wm. M. Rheem

Inventor:
Frederick P. Rosback,
by Dyrenforth & Dyrenforth,
Attys.

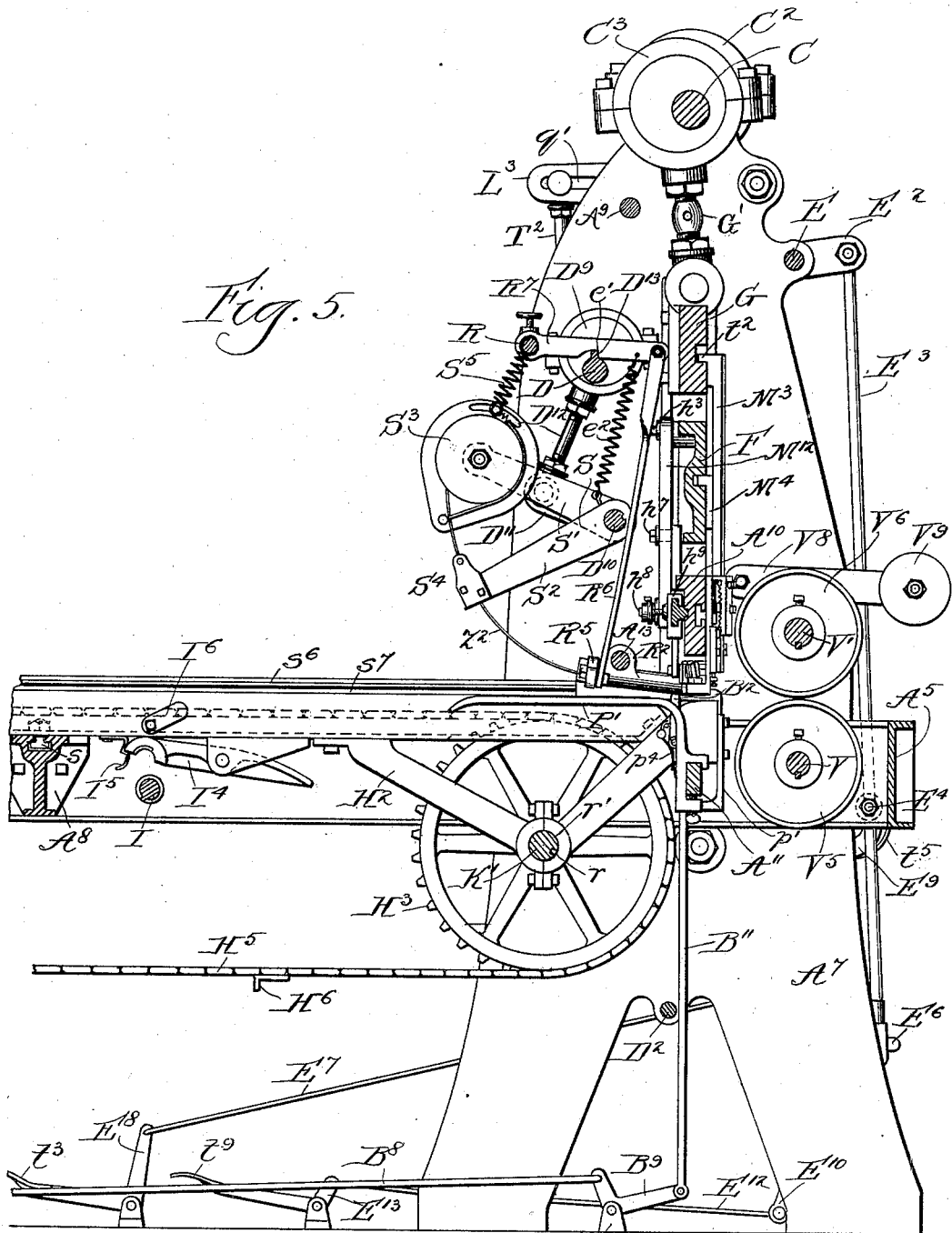

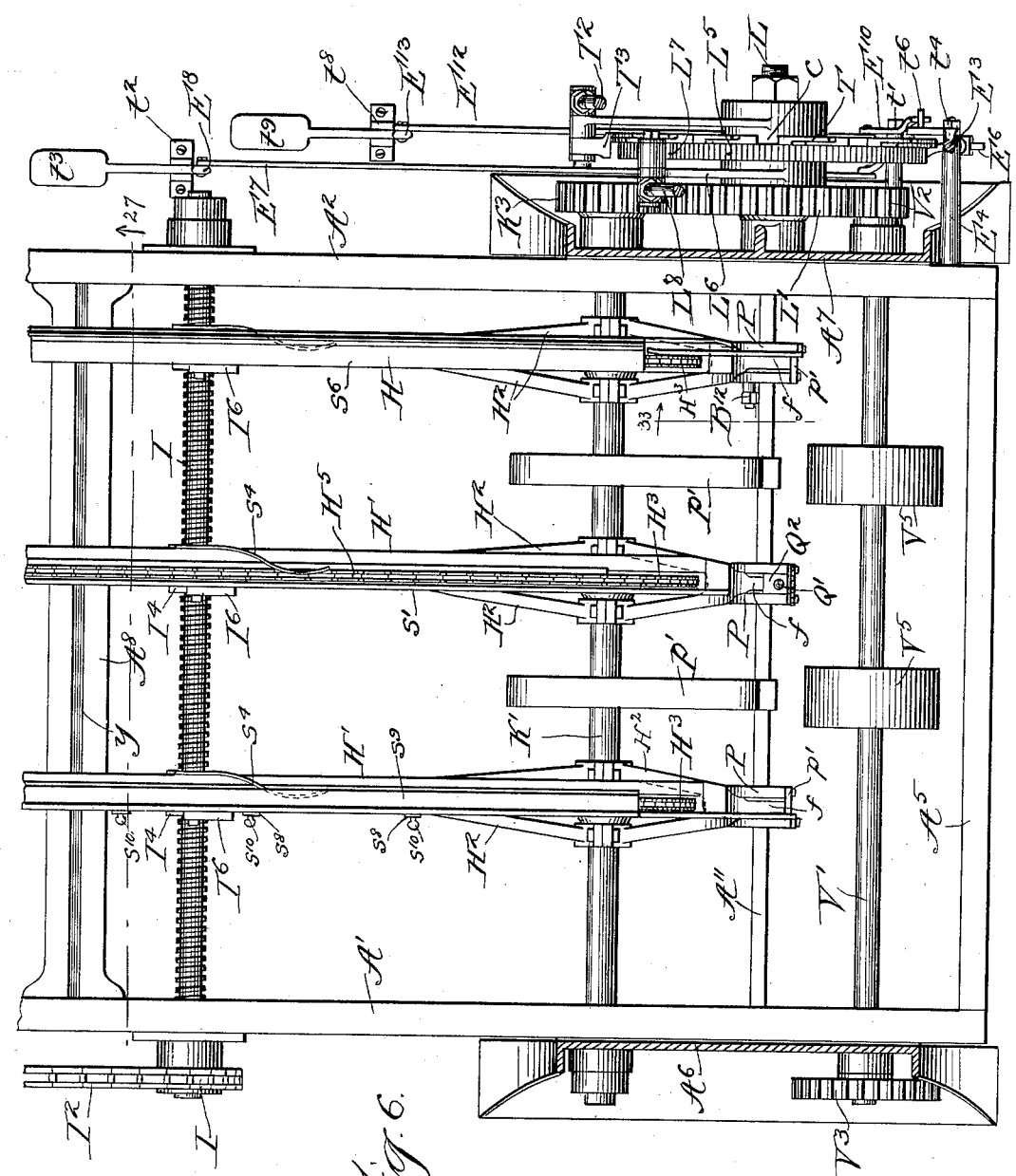

No. 608,796. Patented Aug. 9, 1898.
F. P. ROSBACK.
MACHINE FOR MAKING BOX BLANKS.
(Application filed Nov. 27, 1896.)
(No Model.) 14 Sheets—Sheet 7.
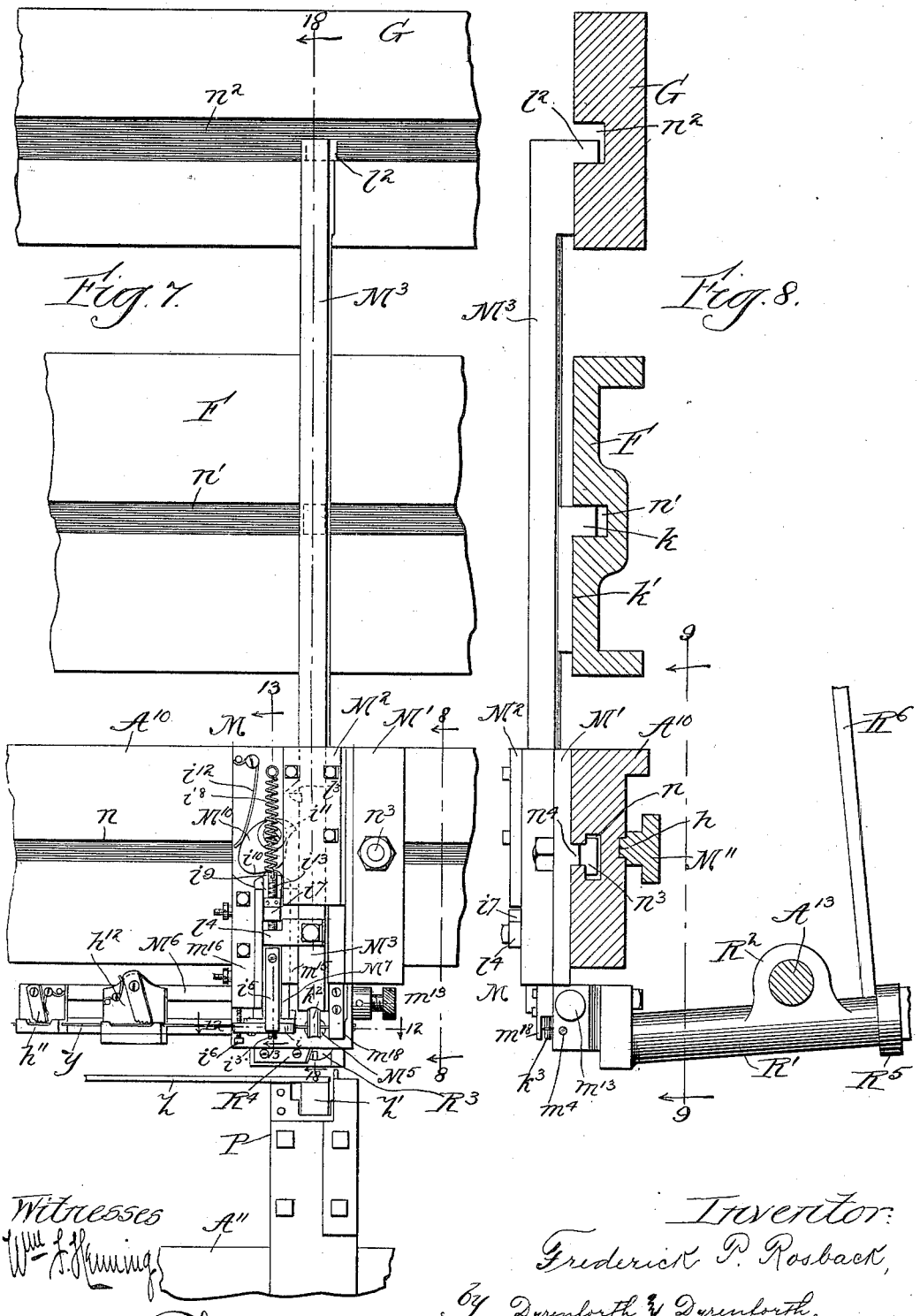

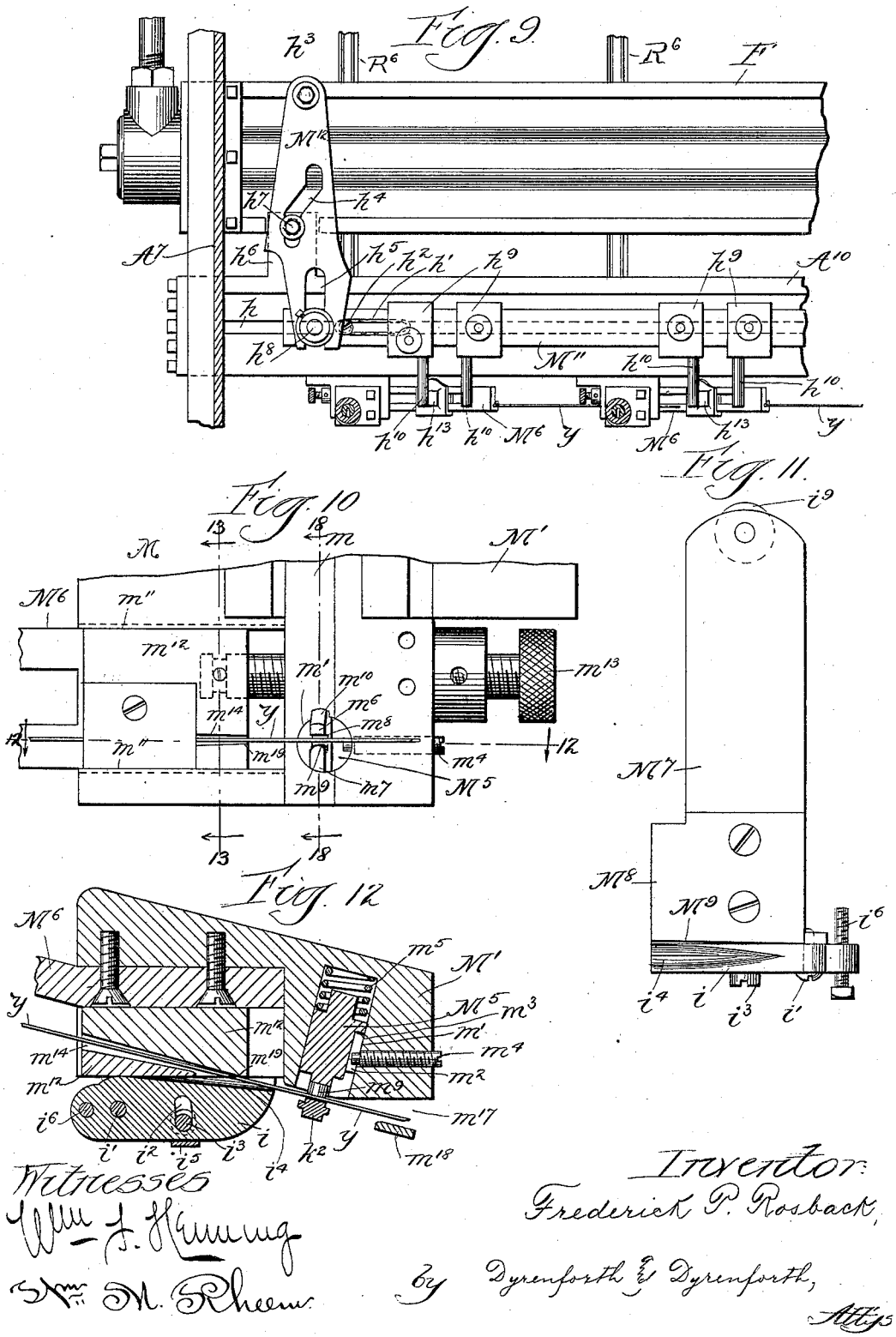

No. 608,796. Patented Aug. 9, 1898.
F. P. ROSBACK.
MACHINE FOR MAKING BOX BLANKS.
(Application filed Nov. 27, 1896.)
(No Model.) 14 Sheets—Sheet 9.
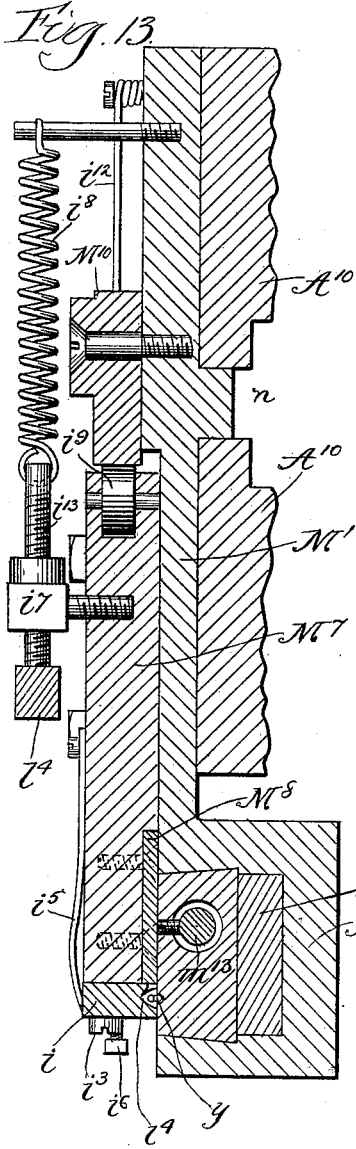
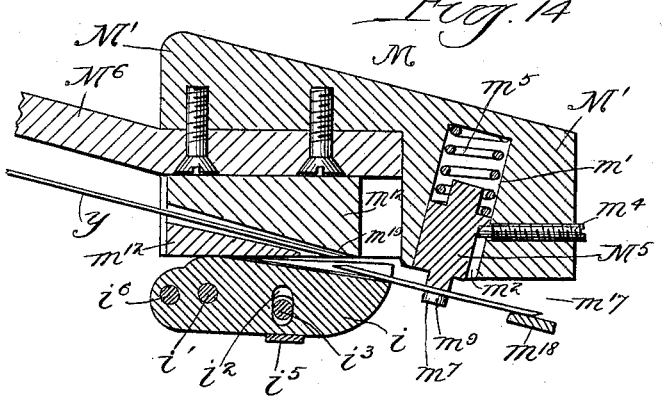
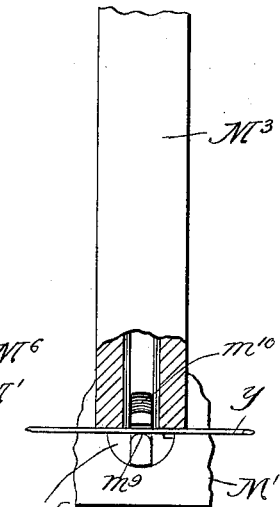
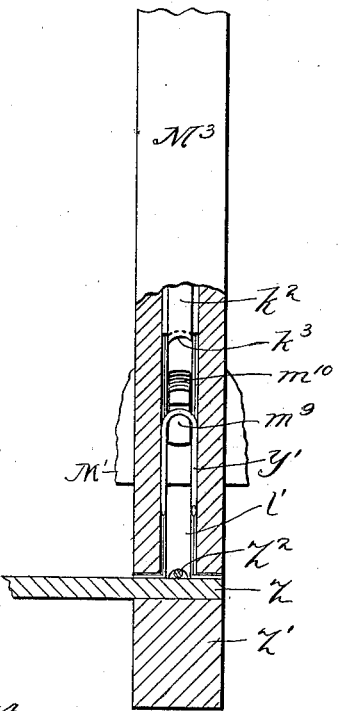
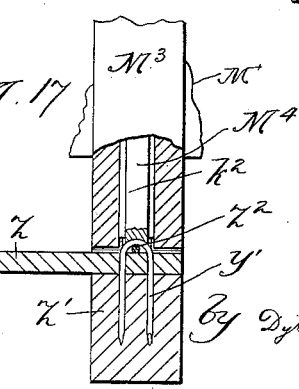
Witnesses
Wm. F. Henning
Wm. M. Rheem
Inventor
Frederick P. Rosback,
By Dyrenforth & Dyrenforth,
Attys.
THE NORRIS PETERS CO., PHOTO-LITHO., WASHINGTON, D. C.

No. 608,796. Patented Aug. 9, 1898.
F. P. ROSBACK.
MACHINE FOR MAKING BOX BLANKS.
(Application filed Nov. 27, 1896.)
(No Model.) 14 Sheets—Sheet 10.
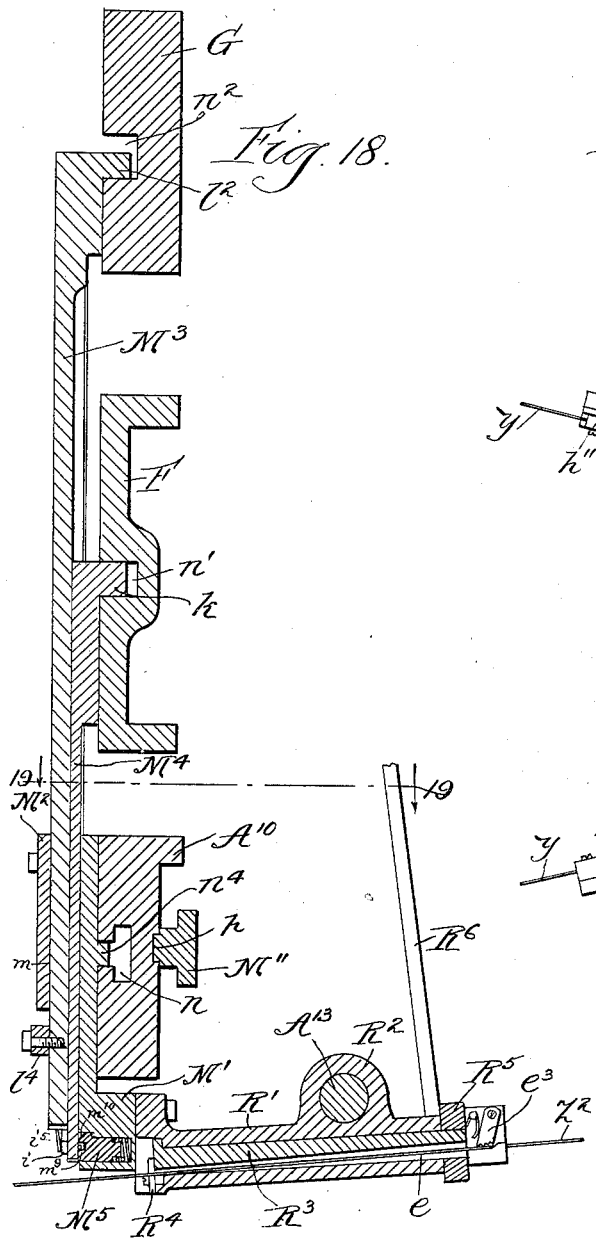
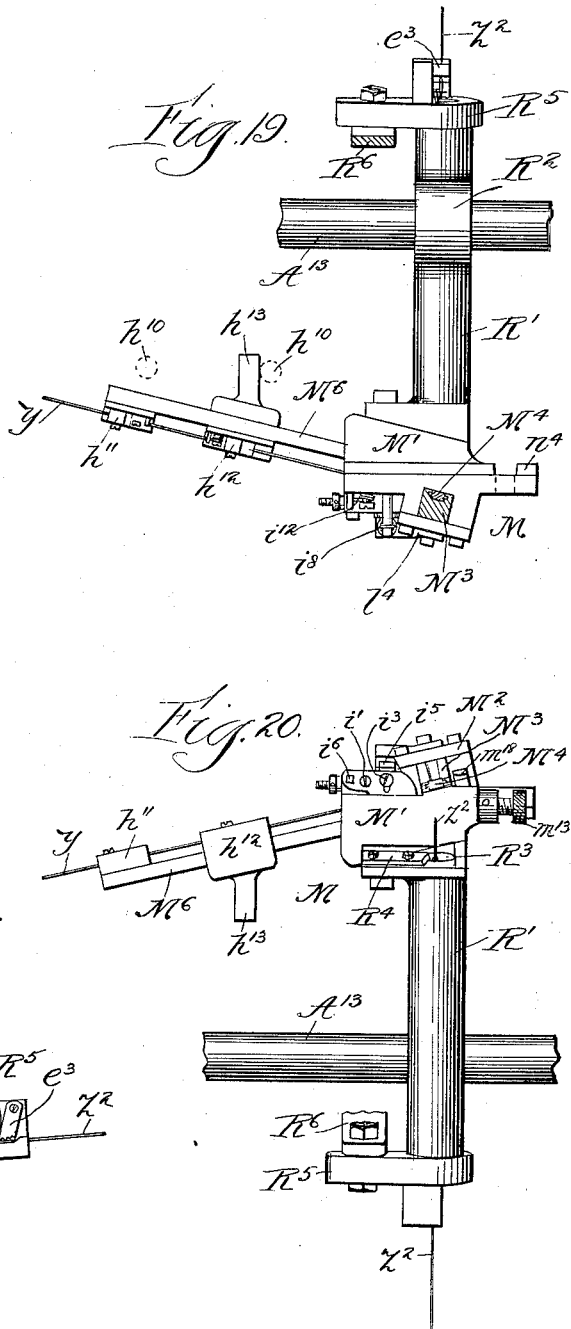
Witnesses
Wm. F. Henning
Wm. M. Rheem
Inventor:
Frederick P. Rosback,
by Dyrenforth & Dyrenforth,
Attys.

No. 608,796. Patented Aug. 9, 1898.
F. P. ROSBACK.
MACHINE FOR MAKING BOX BLANKS.
(Application filed Nov. 27, 1896.)
(No Model.) 14 Sheets—Sheet 11.
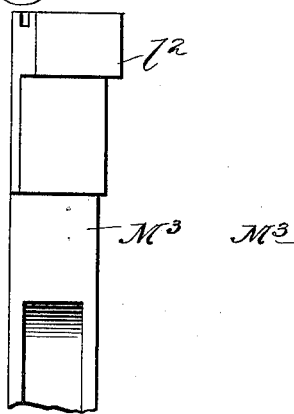
Fig. 21.
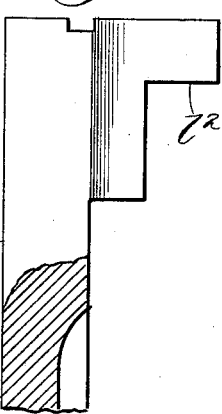
Fig. 22.
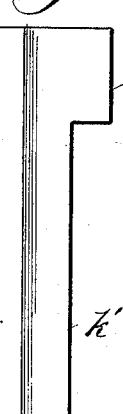
Fig. 23.
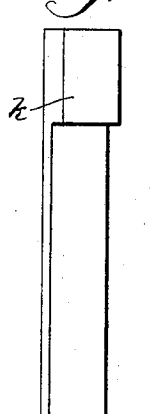
Fig. 24.
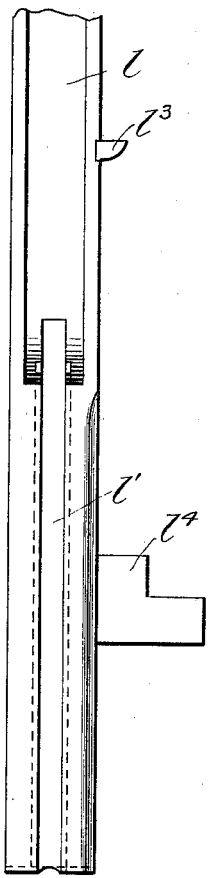
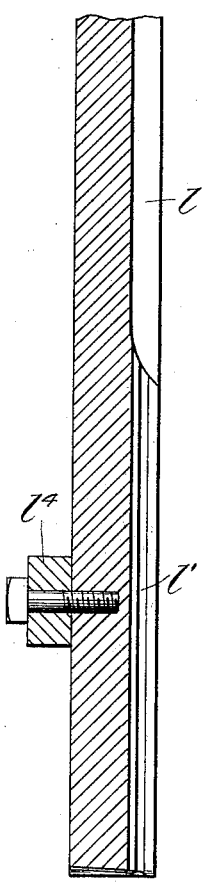
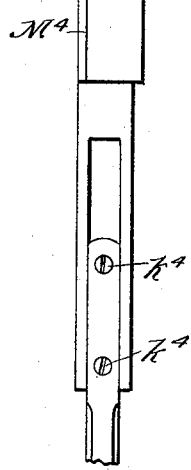
Witnesses
Inventor:
Frederick P. Rosback,
by Dyrenforth & Dyrenforth,
Attys.

No. 608,796. Patented Aug. 9, 1898.
F. P. ROSBACK.
MACHINE FOR MAKING BOX BLANKS.
(Application filed Nov. 27, 1896.)
(No Model.) 14 Sheets—Sheet 12.
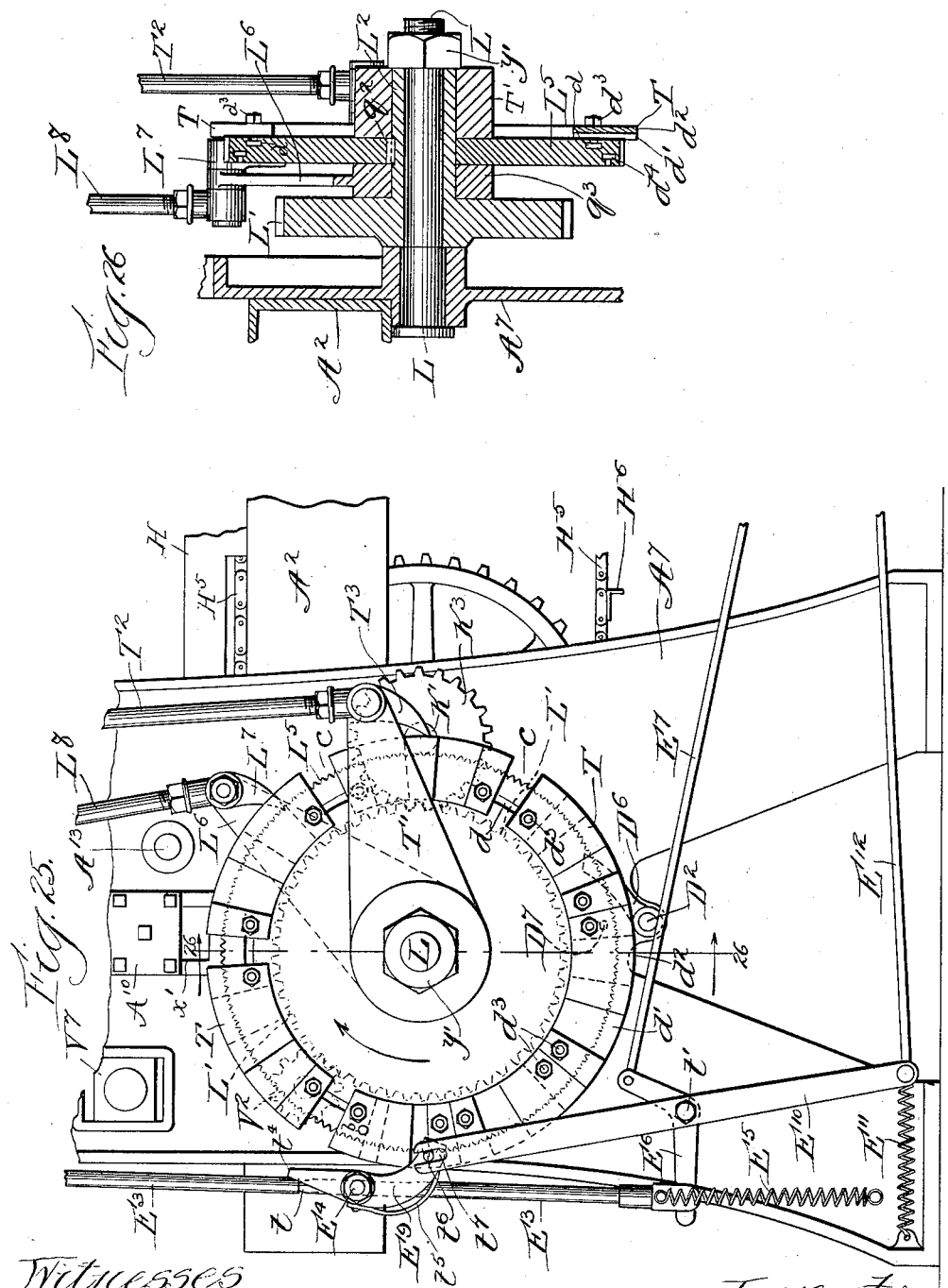

No. 608,796. Patented Aug. 9, 1898.
F. P. ROSBACK.
MACHINE FOR MAKING BOX BLANKS.
(Application filed Nov. 27, 1896.)
(No Model.) 14 Sheets—Sheet 13.
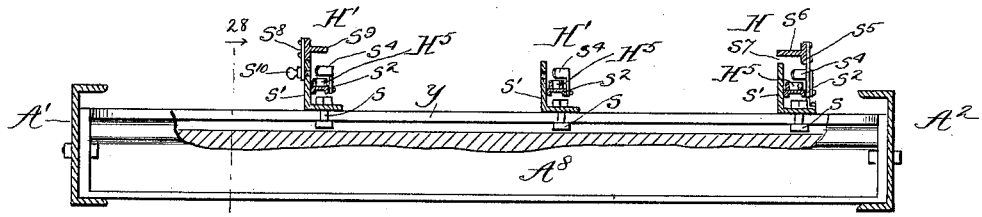
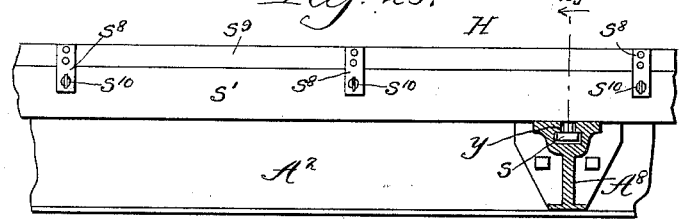
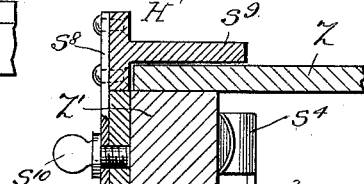
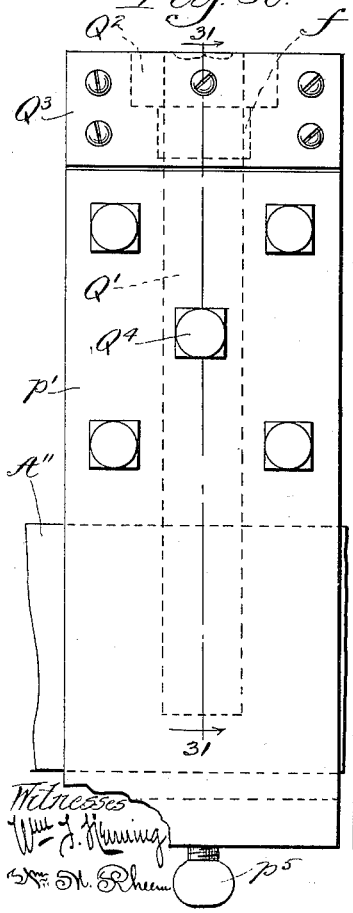
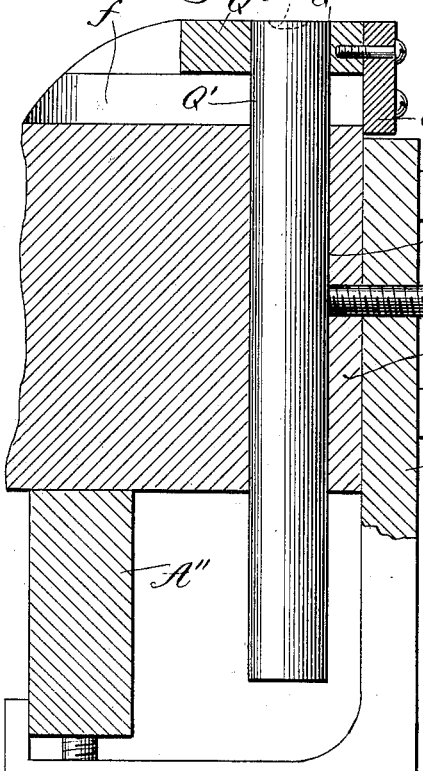
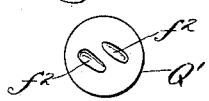
Inventor:
Frederick P. Rosback,
by
Dyrenforth & Dyrenforth
Attys.
THE NORRIS PETERS CO., PHOTO-LITHO., WASHINGTON, D. C.

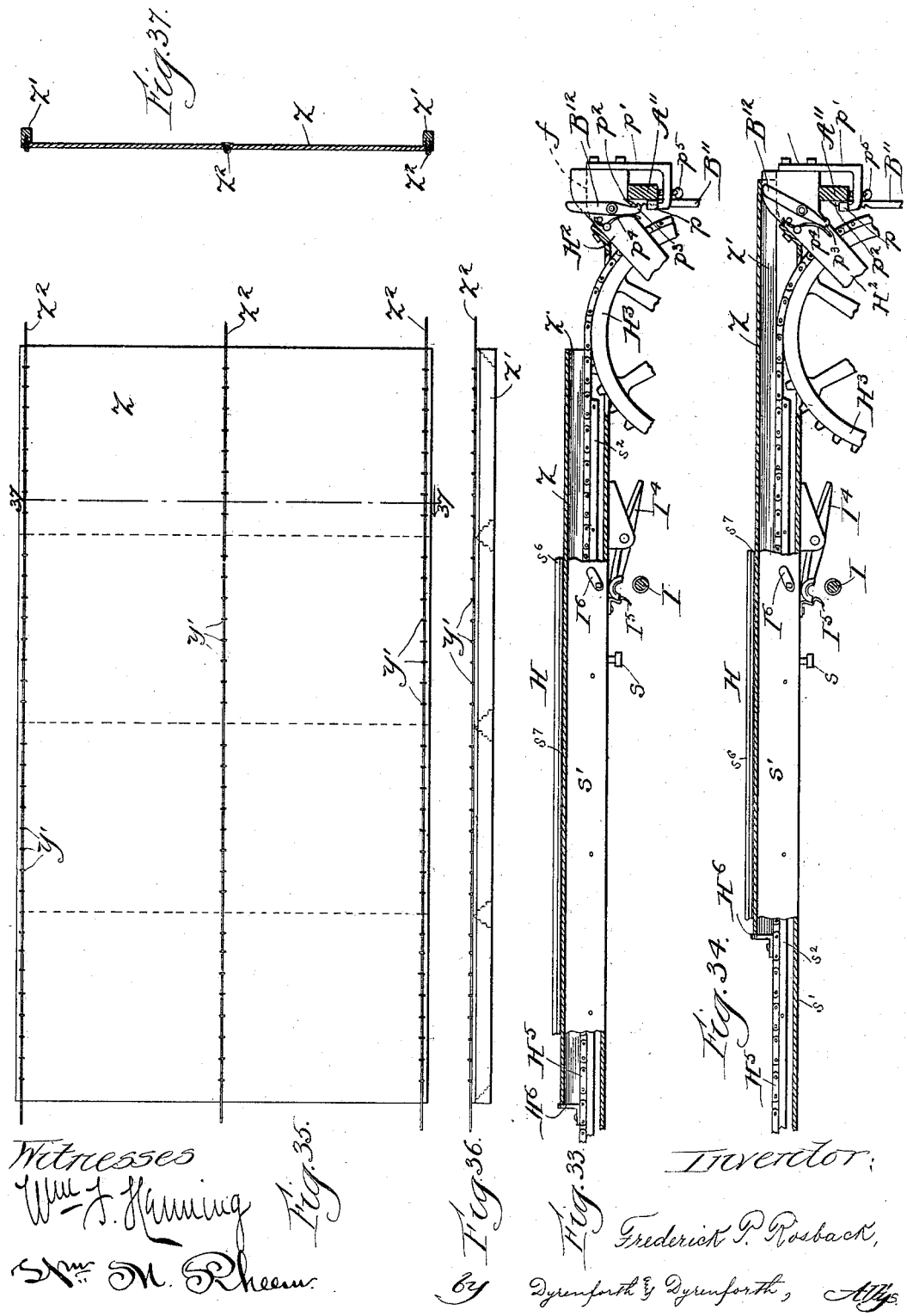

UNITED STATES PATENT OFFICE.

FREDERICK P. ROSBACK, OF CHICAGO, ILLINOIS, ASSIGNOR TO WILLIAM P. HEALY, OF SAME PLACE.

MACHINE FOR MAKING BOX-BLANKS.

SPECIFICATION forming part of Letters Patent No. 608,796, dated August 9, 1898.

Application filed November 27, 1896. Serial No. 613,574. (No model.)

*To all whom it may concern:*

Be it known that I, FREDERICK P. ROSBACK, a citizen of the United States, residing at Chicago, in the county of Cook and State of Illinois, have invented a new and useful Improvement in Machines for Making Box-Blanks, of which the following is a specification.

The box-blank which this machine is adapted to manufacture consists of a sheet of thin lumber in one or more lengths or sections, provided on one side at opposite edges and also between the edges, if desired, with longitudinally-extending reinforcing-cleats and on the opposite side with strengthening-wires, the said wires, sheet, and cleats being fastened together with staples or the like which straddle the wires and extend through the sheet into the cleats. In the case of a comparatively short box the intermediate cleat may be dispensed with and an intermediate strengthening-wire provided and fastened in place by means of staples which are clenched on the inner face of the sheet. A box-blank of the latter description is illustrated in the last figures of the drawings. The strengthening-wires extend past opposite ends of the blank, and at the points which are to form corners of a box the cleats and sheet are preferably step-mitered in a machine separate from the present machine. By bending the blank at the cuts four sides of a box are produced, and box ends are afterward fastened against the outer cleats with nails or otherwise to complete the box. The cover portion of the box may be fastened down by twisting the projecting ends of the strengthening-wires together.

The present invention is in the nature of an improvement upon machines for the same purpose shown and described in United States Patent No. 518,038, granted to Knudtson and Uhri April 10, 1894, and in an application of Jacob Uhri, Serial No. 569,157, filed November 16, 1895.

My object is to produce a machine of a less complicated and expensive construction than those referred to and which, though operating upon the same general principle, shall perform the work of turning out box-blanks more quickly, perfectly, and economically.

Broadly stated, the machine involves cleat-guides relatively adjustable to position the cleats $Z'$ for blanks of different widths, guides also adjustable with the cleat-guides for the opposite edges of the sheet Z, tacking or stapling devices above the path of the sheet and cleats adjustable with the cleat-guides, and feed mechanism for a strengthening-wire $Z^2$ at each staple device. At the cleat-guides is preliminary feed-operating mechanism which when the cleats and sheet are placed in their guides may be operated to advance the material to the staple-drivers. The feed mechanism which advances the blank material beneath or across the staple-drivers and strengthening-wire feeders is intermittent in its action and alternates with the staple-drivers, so that the material is at rest while the staples are being driven.

The machine further involves mechanism for severing the strengthening-wires when a blank has passed from beneath the staple-drivers and for stopping the machine until material for another blank has been advanced to the staple-drivers.

Lastly, the machine involves "skipper mechanism," which at predetermined intervals in the passage of the blank accelerates the feed thereof, so that staples will not be driven at points where the step-miter cuts are afterward to be made.

Figure 2:
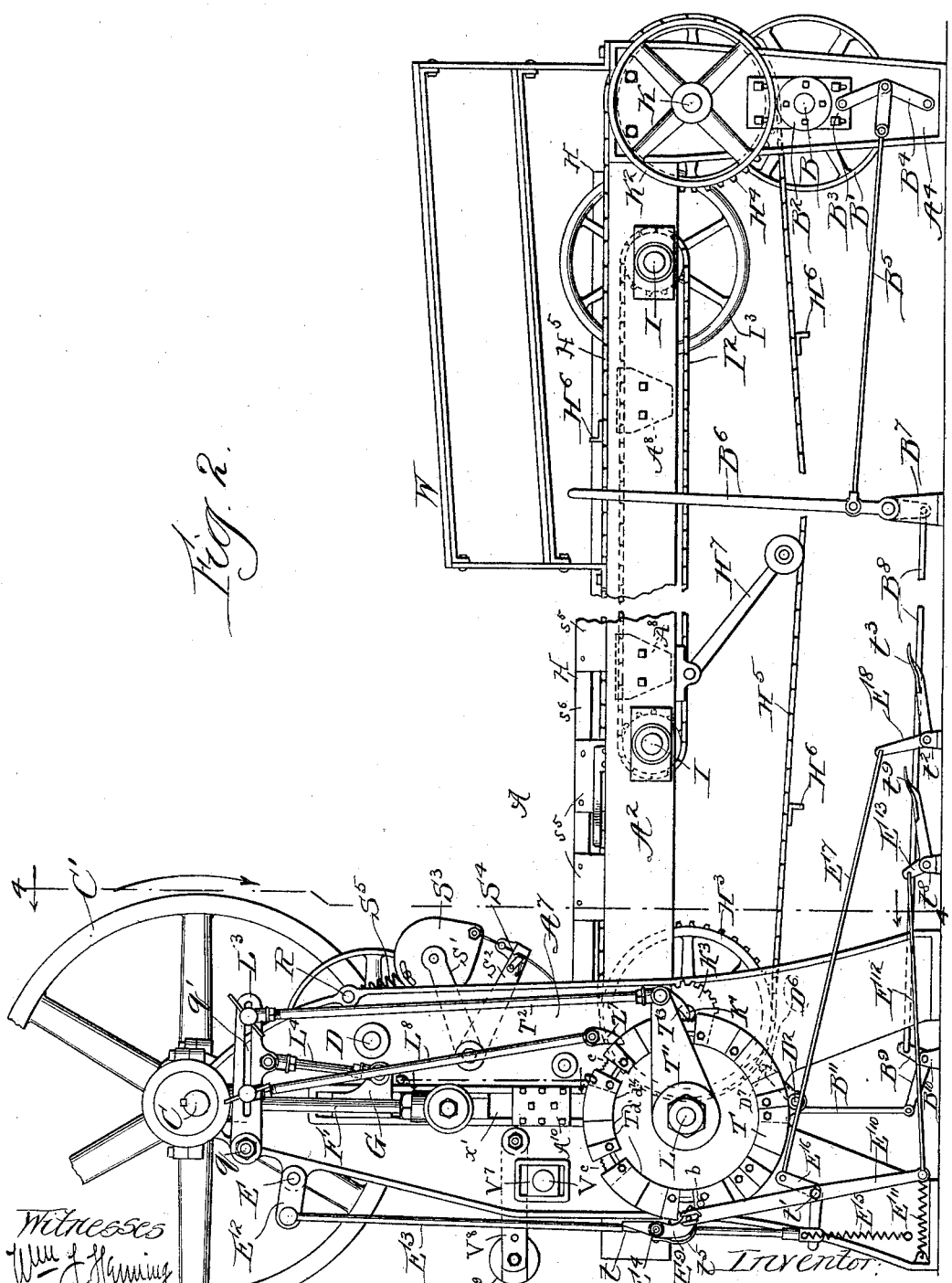
Figure 3:
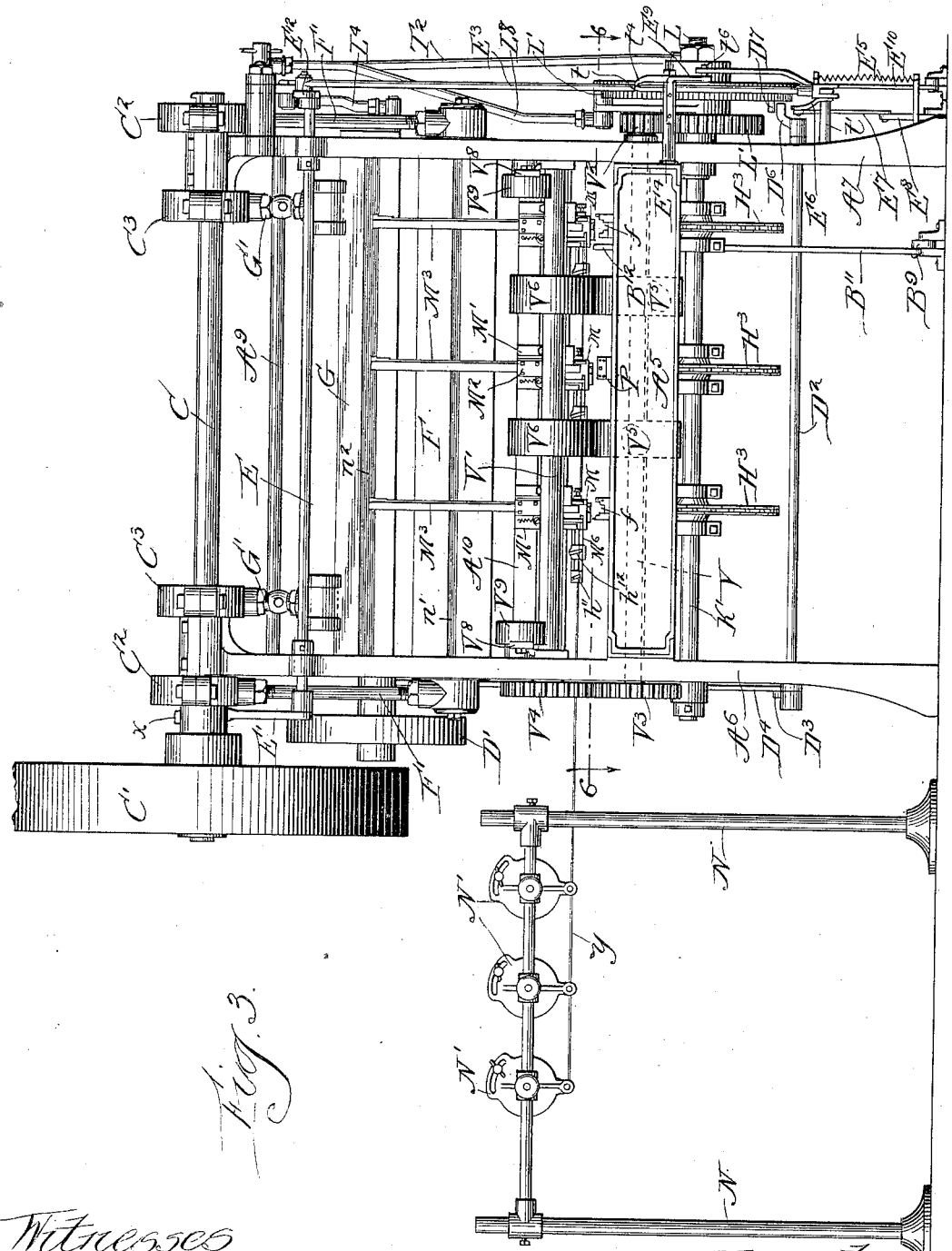

In the drawings, Figure 1 is a broken elevation of the right-hand side of the machine, the main driving-shaft being in section and the main driving-pulley thus removed; Fig. 2, a broken elevation of the left-hand side of the machine; Fig. 3, a broken elevation of the rear end of the machine; Fig. 4, a section taken on line 4 of Fig. 2 and viewed in the direction of the arrow; Fig. 5, an enlarged broken section taken on line 5 of Fig. 4; Fig. 6, a broken and enlarged plan section taken on line 6 of Fig. 3; Fig. 7, a broken and enlarged elevation of certain details at the rear end portion of the machine, showing a staple forming and driving device and attendant parts; Fig. 8, a section taken on line 8 of Fig. 7; Fig. 9, a reduced section taken on line 9 of Fig. 8, corresponding with line 9 in Fig. 2; Fig. 10, an enlarged broken elevation of the lower end portion of one of the staple forming and driving devices, with certain parts removed; Fig. 11, an enlarged detail view of a movable staple-wire cutting and guiding device forming a part of a staple forming and driving device; Fig. 12, a plan section taken on line 12 of Fig. 10, corresponding with line 12 of Fig. 7; Fig. 13, a section taken on line 13 of Fig. 10, corresponding with line 13 in Fig. 7; Fig. 14, a view the same as Fig. 12, but showing moving parts in another position; Figs. 15, 16, and 17, enlarged, broken, and sectional elevations of the lower end portion of a staple forming and driving device, illustrating three steps in its operation of forming a staple and driving it over a strengthening-wire through a sheet and into a cleat; Fig. 18, a reduced section taken on line 18 of Fig. 10, corresponding with line 18 in Fig. 7; Fig. 19, a section taken on line 19 of Fig. 18; Fig. 20, a broken bottom plan view of the parts shown in Figs. 18 and 19, it being in effect a bottom plan view of any one of the staple forming and driving devices; Fig. 21, a broken elevation of a staple-forming bar, the same being a part of one of the staple forming and driving devices; Fig. 22, a broken view, partly in side elevation and partly in section, of the bar shown in Fig. 21; Figs. 23 and 24, broken elevations of a staple-driving bar which moves in guides on the bar shown in Figs. 21 and 22 to drive the staples after they have been formed; Fig. 25, an enlarged broken elevation showing the intermittent feed and skipper mechanisms, the same parts being shown on a reduced scale in Fig. 2; Fig. 26, a broken section taken on line 26 of Fig 25; Fig. 27, a section taken on line 27 of Fig. 6, with a portion of the cleat-guide-supporting bar broken away to expose details which would otherwise be hidden; Fig. 28, a section on line 28 of Fig. 27; Fig. 29, an enlarged section of the left-hand cleat-guide bar shown in Fig. 6, the section being upon line 29 in Fig. 28 and enlarged, a sheet and cleat being in position; Fig. 30, a broken elevation of one of the anvils beneath a staple forming and driving device; Fig. 31, a broken section on line 31 of Fig. 30; Fig. 32, a top end or plan view of a clencher-bar shown in Fig. 31; Figs. 33 and 34, broken and reduced sections taken on line 33 of Fig. 6 and illustrating certain details of construction of the feed mechanism and cleat-guides; Figs. 35 and 36, a plan view and a side elevation, respectively, of a completed blank, showing by dotted lines the step-miter cuts; and Fig. 37, a section taken on line 37 of Fig. 35. In each instance the section is taken in the direction of the arrow at the section-line in the figure referred to.

A is the main frame of the machine, comprising for the most part two parallel horizontally-extending side bars $A'$ $A^2$, mounted at their forward ends upon legs $A^3$ $A^4$; an end bar $A^5$, extending between the side bars at the rear end of the machine; cheeks or side frames $A^6$ $A^7$, secured against and supporting the rear end portions of the side bars; cross-bars $A^8$ in the positions indicated in Fig. 2; a tie-rod $A^9$ toward the top of the cheeks; a cross-bar $A^{10}$, fastened at opposite ends to the cheeks, and a cross-bar $A^{11}$ below and parallel with the bar $A^{10}$.

Passing through and journaled toward opposite end portions in the legs $A^3$ $A^4$ is a drive-shaft B, provided beyond the leg $A^3$ with a belt-pulley $B'$ and beyond the leg $A^4$ with a friction drum or pulley $B^2$. C is what may be termed the "main" drive-shaft of the machine, journaled toward opposite ends in the tops of the cheeks $A^6$ $A^7$, and D is a third independent drive-shaft, also journaled toward opposite ends in the cheeks.

Loosely mounted upon the shaft C is a large belt-pulley $C'$, provided at the shaft with a clutch member, the shaft being provided with a companion clutch member, which when thrown into engagement with the clutch member on the pulley causes the shaft to be rotated by the pulley. The pulley $C'$ is belted to a suitable line-shaft or other driving power and rotates constantly. Any suitable clutch may be employed in this connection, and as the one I use is of a common construction I have not encumbered the drawings with detail views thereof. It will suffice to say that on one of the clutch members is a spring push-pin $x$, which when pressed in the inward direction against the resistance of its spring releases the clutch members, so that the pulley rotates upon the shaft, and which when released springs outward and produces engagement between the clutch members, whereby the shaft rotates with the pulley.

The clutch-operating mechanism comprises a rock-shaft E, journaled at opposite ends in the cheeks and carrying beyond the cheek $A^6$ an arm or lever $E'$, which is raised at its free end by the rocking of the shaft E in one direction to extend into the path of the pin $x$ and compress the same to release the clutch members and which is swung downward by the rocking of the shaft in the opposite direction to release the pin $x$ and permit the clutch members to engage. On the opposite end of the rock-shaft E beyond the cheek $A^7$ is an arm or crank $E^2$, to which a vertical rod $E^3$ is pivotally connected at its upper end.

Rigidly secured to and extending from the rear end portion of the side bar $A^2$ is an arm or pin $E^4$, (most plainly shown in Figs. 3 and 6,) provided toward its free end with a guide-opening, through which the rod $E^3$ passes. Connected with the lower end of the rod $E^3$ is a spring $E^5$, which at its opposite end is fastened to a pin extending from the cheek $A^7$, as shown, for example, in Figs. 2, 3, 4, and 25, the spring operating normally to draw the rod in the downward direction and press the arm $E'$ into the path of the pin $x$. Above the guide $E^4$ the rod $E^3$ is provided with a notch $t$, (see Figs. 2, 3, and 25,) and at its lower end the rod is pivotally connected to an arm of a bell-crank lever $E^6$, the lever being fulcrumed upon a pin $t'$, extending from the cheek $A^7$. The other arm of the bell-crank lever $E^6$ is pivotally connected with a rod $E^7$, which at its opposite end connects with an arm of a bell-crank lever $E^8$, fulcrumed upon a bracket $t^2$, fastened to the floor. The other arm of the bell-crank lever $E^8$ is shaped to form a treadle $t^3$.

Fulcrumed upon the end of the pin or guide $E^4$ is a lever $E^9$, provided at its upper end with a laterally-inclined notch-engaging point $t^4$, (see, for example, Figs. 3, 6, and 25,) a finger-spring $t^5$, fastened to the guide $E^4$, operating to press the lever $E^9$ at its end $t^4$ normally into the path of the notch $t$ on the rod $E^3$. On the lower end portion of the lever $E^9$ is a laterally-projecting pin $t^6$.

$E^{10}$ is a lever fulcrumed between its ends upon the pin $t'$ and provided at its upper end with a slot $t^7$, (see Fig. 25,) at which it engages the pin $t^6$. A coiled spring $E^{11}$ connects at one end with the lever $E^{10}$ and is fastened at its opposite end against the cheek $A^7$. The tendency of the spring $E^{11}$ is to draw the lever $E^{10}$ at its lower end in the backward direction. Pivotally connected with the lower end of the lever $E^{10}$ is a forwardly-extending rod $E^{12}$, which at its opposite end connects with one arm of a bell-crank lever $E^{13}$, fulcrumed upon a bracket $t^8$ on the floor. The other arm of the bell-crank lever $E^{13}$ is shaped to afford a treadle $t^9$.

It will be understood from the foregoing description that downward pressure upon the treadle $t^3$ causes the rod $E^3$ to be thrust upward against the resistance of the spring $E^5$ and rock the shaft $E$ to swing the arm $E'$ downward out of the path of the pin $x$, thereby releasing the latter and causing the clutch members to engage and the pulley $C'$ to rotate the shaft $C$. When the rod $E^3$ is raised, as described, its notch is engaged by the pointed end $t^4$ of the lever $E^9$, and thus held in its raised position to maintain the arm $E'$ out of the path of the pin $x$. When at any time it is desired to stop the rotation of the shaft $C$, the treadle $t^9$ is pressed downward, causing the lever $E^{10}$ to be swung against the resistance of the spring $E^{11}$ and to swing the lever $E^9$ against the resistance of the spring $t^5$ and release it from the notch $t$, whereby the rod $E^3$ is released and drawn downward by its spring $E^5$ to raise the arm $E'$ into the path of the pin $x$. Thus when in the rotation of the shaft $C$ the pin $x$ strikes the arm $E'$ it is depressed and disengages the clutch members. The clutch, it will be noted, always causes a stoppage of the shaft $C$ at the same point in its rotation, the object of which will appear later on.

In the cheeks $A^6$ $A^7$ are coincident vertical guide-openings $x'$. (See Figs. 1 and 2.) On the shaft $C$ just beyond the cheeks $A^6$ $A^7$ are companion eccentrics $C^2$ $C^2$. Also upon the shaft just within the cheeks are companion eccentrics $C^3$ $C^3$.

F is a vertically-movable operating-bar or cross-head extending at opposite ends through and sliding in the guide-slots $x'$, beyond which they are connected, by means of connecting-rods $F'$ $F'$, with the eccentrics $C^2$.

G is a vertically-movable operating-bar or cross-head, also sliding at opposite ends in the guide-slots $x'$ of the cheeks and connected, by means of connecting-rods $G'$, with the eccentrics $C^3$. The eccentrics are so adjusted upon the shaft with relation to each other that the eccentrics $C^3$ move about one-fourth of a revolution in advance of the eccentrics $C^2$. The cross-heads F G actuate the staple forming and driving devices, hereinafter described, and the cross-head F actuates the intermittent feed mechanism, as will be explained later on.

Resting upon the cross-bars $A^8$ near the side bar $A^2$ (see Fig. 27) is a sheet and cleat guide H, which may be stationary. Also resting upon the cross-bars $A^8$ and extending parallel with the guide H are one or more cleat-guides H'. Each of the said guides is provided with bolts $s$, having heads which fit and slide in T-shaped sockets $y$ in the cross-bars. (See Figs. 6, 27, 28, and 29.) The guides H' are laterally adjustable upon the bars $A^8$ to accommodate sheets of veneer of different widths for boxes of different sizes and to position the cleats as desired.

Extending parallel with the bars $A^8$ and journaled at opposite ends in the side bars A' $A^2$ are similarly constructed worm-shafts I, provided beyond the side bar A' with sprocket-wheels I', geared together by means of a drive-chain $I^2$. (See Fig. 1.) On the forward worm-shaft is a hand-wheel $I^3$, by means of which the said shaft may be turned in either direction and through the drive-chain $I^2$ produce corresponding rotation of the other worm-shaft. Each guide-bar H', and the guide H also, if desired, is provided at each of the worm-shafts with a pivotal lever or dog $I^4$. (See Figs. 5, 33, and 34.) The figures show the dogs raised out of engagement with the worm-shafts I, they being held in their raised positions by spring-catches $I^5$. To adjust either of the guide-bars laterally, its dogs $I^4$ may be pressed downward into engagement with the worm-shafts and held in such engagement by turning down swinging latches $I^6$, which prevent rise of the dogs, after which the worm-shafts are rotated by means of the hand-wheel $I^3$ to move the guide-bar laterally and equally throughout its extent. When the adjustment is made, the dogs may be returned to the positions shown.

Each of the guides is formed of a bar $s'$, L-shaped in cross-section, and through which the bolts $s$ pass, as shown. Fastened against the bar $s'$ is a shelf or bearing-strip $s^2$, provided at intervals with fingers $s^3$, carrying leaf-springs $s^4$, which project over the strip $s^2$ in the direction of the bar $s'$.

On the guide H and forming, if desired, a permanent part thereof are vertical plates $s^5$, (see Fig. 27,) carrying a horizontal strip $s^6$, which projects over the bearing-strip $s^2$ and bar $s'$, leaving an open space $s^7$ to receive and guide one edge of the sheet Z, as hereinafter described. The guide H operates to position one edge cleat $Z'$ and the adjacent edge of the sheet Z.

Adjustably fastened against the guide $H'$, which is to operate as the guide for the other outer cleat and edge of the sheet, are plates $s^8$, carrying a horizontal laterally-projecting strip $s^9$, which extends over the strip $s^2$ and tends to hold down and guide the edge of the sheet. The plates $s^8$ may be attached to any one of the guides $H'$ by means of thumb-screws $s^{10}$, as shown. To place a sheet Z and cleats $Z'$ in position, the cleats are passed from the front end of the machine into the guides beneath the strips $s^6$ $s^9$ and between the spring-fingers $s^4$ and bar $s'$, and the sheet Z is also passed under the strips $s^6$ $s^9$, as indicated.

For convenience in handling the sheets a table or sheet-supporting frame W is provided upon the forward end of the machine, as shown, and the strips $s^6$ $s^9$ extend from the rear end of the guides forward to a point somewhat in advance of the said support or table. The plates $s^5$ $s^8$ are formed, preferably, of thin springy material, whereby the strips $s^6$ $s^9$ will yield slightly under any unevenness at the edges of the sheet to prevent binding of the latter as it passes through.

K is a shaft journaled at opposite ends in the legs $A^3$ $A^4$, and $K'$ is a companion shaft thereto, journaled at opposite ends in the cheeks $A^6$ $A^7$, the shafts being in the same horizontal plane and in the relative positions shown. Each of said shafts is provided with a longitudinally-extending groove $r$, as shown at the shaft $K'$ in Fig. 5.

Each of the guides H $H'$ is provided on its rear end at the under side with a pair of brackets $H^2$, having openings $r'$, at which they loosely surround the shaft $K'$. Confined between each pair of brackets $H^2$ is a belt or sprocket wheel $H^3$, provided with a feather to slide in the groove $r$ and cause the sprocket-wheel to rotate with the shaft. The forward end of each guide H $H'$ is also provided at the under side with a pair of brackets having openings, like the openings $r'$, loosely surrounding the shaft K. Between each pair of the latter brackets is a belt or sprocket wheel $H^4$, feathered upon the shaft to rotate therewith.

No special detail view is given of the brackets at the forward ends of the guides for the reason that they are mere duplications of the brackets $H^2$ and operate, like the latter, to loosely embrace the sprocket-wheels and slide the latter laterally upon the shaft as the guides are adjusted to position the cleats $Z'$, as before described. The tops of the sprocket-wheels $H^3$ $H^4$ are just beyond opposite ends of the shelves or guide-strips $s^2$ and in the plane of the latter. It will be understood that there is a sprocket-wheel $H^3$ at one end of each of the guides H $H'$ and a sprocket-wheel $H^4$ at the opposite end thereof, the sprocket-wheels being adjustable with the guides, so as always to maintain the same position with relation thereto.

Extending over each sprocket-wheel $H^3$ and its companion sprocket-wheel $H^4$ is a flexible feed-belt, preferably in the form of a chain $H^5$, which on the upper side rests and slides upon the guide-strip $s^2$. Each feed-chain is provided at stated intervals (in the present machine nine feet apart) with stops or cleat and sheet engaging projections $H^6$, they being on the outer side of the chain to project upward as the chains pass from the sprocket-wheels $H^4$ to the sprocket-wheels $H^3$ over the guide-strips $s^2$.

On the under side of each guide, in the position indicated, for example, in Fig. 2, is a chain-tightener $H^7$ of common construction. The projections $H^6$ of the respective chains are exactly parallel with each other, so that they travel abreast.

On the shaft K beyond the leg $A^4$ is a friction-pulley $K^2$, adapted to engage with the friction pulley or drum $B^2$. At the pulley $B^2$ the shaft B is journaled in a vertically-sliding block or plate $B^3$, (see Fig. 2,) which has vertically-elongated slots, as shown, and is secured at said slots by means of bolts to the leg. A toggle-lever $B^4$ is pivoted at its lower end against the leg $A^4$ and its upper end to the plate or journal-block $B^3$. Connected with the middle of the toggle-lever is a toggle-operating rod $B^5$, extending to an operating-lever $B^6$, fulcrumed near its lower end upon a bracket $B^7$ on the floor. It will be understood that the pulley $B'$ is belted to a line-shaft and rotates the shaft B constantly. Movement of the lever $B^6$ to the left in Fig. 2 causes it to draw upon the rod $B^5$ and straighten the toggle $B^4$ to raise the block $B^3$, friction-pulley $B^2$, and that end of the shaft B, so that the pulley $B^2$ will engage the pulley $K^2$ and rotate the shaft K and its sprocket-wheels and move the feed-chains $H^5$, thereby rotating the sprocket-wheels $H^3$ and shaft $K'$. When a sheet Z and cleats $Z'$ are first placed in position, the lever $B^6$ is moved, as described, to feed the material rapidly and without pause to the point where they are first operated upon by the staple forming and driving devices, and this preliminary feed is independent of the intermittent feeding mechanism before referred to and hereinafter to be described.

On the shaft $K'$ beyond the cheek $A^7$ is a gear-wheel $K^3$. (See Figs. 2, 4, 6, and 25.) Passing through the cheek $A^7$ and fastened therein is a bearing-pin L, threaded along its outer end portion, as most plainly shown in Fig. 26. Mounted upon the bearing-pin at the outer side of the cheek $A^7$ is a gear-wheel $L'$, having a bearing-sleeve $L^2$, which extends nearly to the outer end of the pin and is held against lateral play by a nut $y'$. The gear-wheel $L'$ engages the gear $K^3$. Fulcrumed at $q$ upon the cheek $A^7$ is a lever $L^3$, provided with a longitudinally-extending slot $q'$. A connecting-rod $L^4$ is pivotally secured at its lower end to the adjacent end of the cross-head G, (see Figs. 2 and 3,) and at its upper end it is pivotally connected with the lever $L^3$ between the ends of the latter.

Fastened upon the sleeve $L^2$ with a key $q^2$ or otherwise is a comparatively large ratchet-wheel $L^5$, which is thus in rigid relation to the gear-wheel $L'$. Between the said ratchet-wheel and gear-wheel is a lever $L^6$, having a bearing-sleeve $q^3$, (see Fig. 26,) which loosely surrounds the bearing-sleeve $L^2$, and carrying at its free end a pivotal dog $L^7$, which rides upon the teeth of the ratchet-wheel $L^5$.

$L^8$ is a connecting-rod adjustably and pivotally fastened in its upper end in the slot $q'$ of the lever $L^3$, near the fulcrum $q$. At its lower end the rod $L^8$ is pivotally connected with the free end of the lever $L^6$. In the vertical reciprocation of the cross-head G the connecting-rod $L^4$ swings the lever $L^3$ up and down upon its fulcrum $q$ and reciprocates the rod $L^8$ to swing the lever $L^6$. In each downward plunge the dog $L^7$ engages and turns the ratchet-wheel $L^5$ and in each upward plunge releases the ratchet-wheel, whereby the latter, the gear-wheel $L'$, gear-wheel $K^3$, and shaft $K'$ are rotated intermittingly to turn the sprocket-wheels $H^3$ and give to the feed-chains $H^5$ a corresponding intermittent movement.

As will appear later on, when a blank has been completed and its strengthening-wires cut the machine is stopped by bringing about a disengagement between the clutch members on the drive-shaft C. When the sheet and cleats have been advanced by the preliminary feed, as before described, to the staple forming and driving devices, it is necessary that the preliminary feed be stopped and that the material be afterward advanced by the intermittent feeding mechanism, which is operated, as described, from the shaft C, which also operates the staple-drivers.

The mechanism for automatically stopping the preliminary feed mechanism will be next described. Pivotally connected with the lower end of the lever $B^6$, below the fulcrum of the latter, is a rod $B^8$, which extends in the backward direction and connects with one arm of a bell-crank lever $B^9$, fulcrumed on a bracket $B^{10}$ on the floor. Extending upward from the other arm of the bell-crank lever is a rod $B^{11}$, (see more especially Figs. 5, 33, and 34,) moving at its upper end loosely through a guide $p$ on a bracket $p'$, carried by the bracket $H^2$ of the guide H. The upper end portion of the rod $B^{11}$ is provided with notches $p^2$. Fulcrumed upon the bracket $H^2$ of the guide H is a tripping-lever $B^{12}$, provided at its lower end with a hook $p^3$. A spring $p^4$, bearing against the tripping-lever, presses the latter at its hooked end normally into the path of the notches $p^2$ on the rod $B^{11}$. At its upper end the tripping-lever is rounded, as shown, to produce a cam which extends normally into the path of a passing sheet Z, whereby when the edge of the sheet strikes the tripping-lever the latter is turned from the position shown in Fig. 33 to that shown in Fig. 34. When the operating-lever $B^6$ is turned to the left in Fig. 2 to start the preliminary feed, the rod $B^8$ is drawn to raise the rod $B^{11}$ and cause the tripping-lever $B^{12}$ to engage a notch $p^2$, thereby holding the rod $B^{11}$ raised and the friction-drum $B^2$ in engagement with the friction-pulley $K^2$. As soon as the sheet Z strikes the tripping-lever $B^{12}$ the latter releases the notch $p^2$ and causes the rod $B^{11}$ to drop to the position shown in Fig. 34 and the friction-drum $B^2$ to descend out of engagement with the pulley $K^2$, whereby the preliminary feed mechanism stops, leaving the sheet and cleats in position to be operated upon by the staple-drivers.

In the rear face of the stationary bar $A^{10}$ is a longitudinally-extending T-groove $n$, and in the rear faces of the cross-heads F G are longitudinally-extending grooves $n'$ $n^2$, respectively.

M M are tacking devices or staple forming and driving devices, one being provided for each guide H H'. The devices M are all constructed alike, so that the description of one will answer for all. The shell of each staple forming and driving device comprises a block or back plate $M'$ and a removable cap or covering plate $M^2$, the said plates forming between them a vertical guide-opening $m$.

$M^3$ is a staple-forming bar having a vertical guide-groove $l$ $l'$. This bar is shown in detail in Figs. 21 and 22. The lower part $l'$ of the guide-groove is narrower than the upper part $l$ thereof and is T-shaped in cross-section, as indicated by the full and dotted lines. On the upper end portion of the bar $M^3$ is a projection or shoulder $l^2$, and between the ends of the bar is a cam projection $l^3$. On the bar in the position shown is a laterally-extending projection $l^4$. $M^4$ is a staple-driving bar provided at its upper end with a projecting shoulder $k$ and an enlarged body portion affording a bearing-face $k'$. The lower end portion $k^2$ of the driving-bar is T-shaped in cross-section and provided in its lower end with a concave socket $k^3$. (See Figs. 23 and 24.) Although the bar, as shown, is formed of two pieces fastened together with screws $k^4$, this construction is not essential, as the parts may be formed integral with each other. The upper or enlarged part of the driving-bar $M^4$ fits and slides in the guide-groove $l$ of the bar $M^3$, and the T-shaped portion $k^2$ of the bar $M^4$ fits and slides in the T-groove $l'$ of the bar $M^3$.

In practice the back plate $M'$ of the shell is adjustably fastened against the stationary bar $A^{10}$ by means of a bolt $n^3$, having a T-head which fits the T-groove $n$. (See Fig. 8.) Projecting from the back plate $M'$ is a horizontally-extending lug $n^4$, which also fits into the groove $n$. The shell may be adjusted laterally upon the bar $A^{10}$ and tightened in adjusted position by means of the bolt $n^3$. The said bolt and lug $n^4$ operate together to hold the shell rigidly against vertical or lateral play. The forming-bar $M^3$ along its lower end portion fits and works in the guide-opening $m$ of the shell, the shoulder $l^2$ at the upper end of said bar extending loosely into the groove $n^2$ of the cross-head G. The shoulder $k$ on the driver $M^4$ fits snugly in the groove $n'$ of the cross-head F. The parts are so geared with relation to each other that in the rotation of the drive-shaft C the cross-head G is moved downward until the top of its groove $n^2$ strikes the shoulder $l^2$ of the bar $M^3$, forcing the latter downward to form the staple, as hereinafter described, and then the cross-head F descends to force the driving-bar $M^4$ downward, whereby its end $k^3$ will engage and discharge or drive the staple.

In the face of the back plate $M'$, in the positions shown, for example, in Figs. 10 and 12, is a socket $m'$, into which fits a plunger or staple-forming block $M^5$, provided in its side with a guide-recess $m^2$, terminating in a shoulder $m^3$. Passing through the edge portion of the plate $m'$ and extending into the guide-recess $m^2$ is a screw $m^4$, affording a stop which limits the outward plunge of the block $M^5$. Confined in the socket $m'$ and bearing against the block $M^5$ is a spring $m^5$, which tends to press the block in the outer direction until its shoulder $m^3$ strikes the stop $m^4$. On the outer end of the block are two projections or claws $m^6\,m^7$, separated by a guide passage or groove $m^8$. The lower projection $m^7$ is provided with a rounded upper edge $m^9$, affording a mandrel over which the staple is bent, as presently described, and the upper side of the projection $m^6$ is inclined or beveled to produce a cam $m^{10}$. Fastened against the back plate $M'$ is a horizontal guide-frame $M^6$. Mounted in a recess afforded by guides $m^{11}\,m^{11}$ on the back plate (see Fig. 10) is a horizontally-adjustable sliding cutter-block $m^{12}$, which may be moved by means of an adjusting-screw $m^{13}$, which passes through the back plate above the socket $m'$, as shown. Extending through the block $m^{12}$ in the manner most plainly shown in Fig. 12 is a guide-opening $m^{14}$ for a wire Y, from which the staples Y' are formed. The opening or passage $m^{14}$ is in line with the guide-opening $m^8$ between the claws $m^6\,m^7$. Sliding between vertical guide-projections $m^{15}\,m^{16}$ on the back plate M' (see Fig. 7) is a block or plate $M^7$, (shown in detail in Fig. 11,) carrying a knife $M^8$, provided with a cutting edge $M^9$. A yielding block $i$ is pivotally fastened by means of a screw $i'$ against the under side of the block $M^9$. Extending through the block $i$ is a vertical and elongated slot $i^2$, through which passes a screw $i^3$ into the lower end of the block $M^7$. The block $i$ is provided in its face with a gradually widening and deepening guide-groove $i^4$ for the wire Y, (see Figs. 11, 12, 13, and 14,) and a finger-spring $i^5$ on the block $M^7$ bears against the block $i$ to press it normally against the face of the block $m^{12}$. On the end of the block $i$ is an adjustable set-screw $i^6$ in position to strike against the lower end of the guide $m^{16}$ when the block $M^7$ is raised. Projecting from the plate or block $M^7$ is a bolt $i^7$, having a threaded opening through it for a tensioning-screw $i^{13}$, (see Fig. 13,) to which is attached a spring $i^8$, fastened at its upper end to a pin on the back plate $M'$. The lower end of the tensioning-screw $i^{13}$ affords a stop for the projection $l^4$ on the forming-bar $M^3$. The spring $i^8$ tends normally to raise the block $M^7$ until the set-screw $i^6$ engages the lower end of the guide-piece $m^{16}$. Journaled in the upper end of the block $M^7$ is an antifriction-wheel $i^9$. $M^{10}$ is a pivotal cam-block having a cam-surface $i^{10}$ and a cam projection $i^{11}$. A spring $i^{12}$ bears against the block $M^{10}$ to press the cam-surface $i^{10}$ against the antifriction-wheel $i^9$ and cause the cam projection $i^{11}$ to extend normally into the path of the cam projection $l^3$ on the side of the forming-bar $M^3$. In the forward face of the stationary cross-bar $A^{10}$, on the side opposite the groove $n$, is a guide-groove $h$, sliding in which is a longitudinally-extending bar $M^{11}$, T-shaped in cross-section, as shown, for example, in Figs. 8 and 18. Toward each end of the bar $M^{11}$ (see Figs. 4 and 9) are elongated slots $h'$, through which pass screws $h^2$, fastened in the bar $A^{10}$. These screws hold the bar $M^{11}$ against the stationary bar $A^{10}$, but permit it to slide longitudinally for a distance limited by the ends of the slots. $M^{12}$ is a swinging plate or lever (see, for example, Fig. 9) pivoted at $h^3$ to the cross-head F. Between its ends the lever $M^{12}$ is provided with a cam-slot $h^4$, and in its lower end it has a recess or socket $h^5$. On the stationary bar $A^{10}$ is a vertically-projecting lug $h^6$, carrying a screw or pin $h^7$, which passes through the cam-slot $h^4$ in the lever $M^{12}$. At its recess or socket $h^5$ the lever loosely embraces a pin or screw $h^8$ on the bar $M^{11}$. In the rise and fall of the cross-head F the lever $M^{12}$ rises and falls, the engagement of its cam-slot with the pin or screw $h^7$ causing it to oscillate on its pivot $h^3$ and reciprocate the bar $M^{11}$ longitudinally. Adjustably fastened to the bar $M^{11}$ are blocks or heads $h^9$, in pairs, each provided with a downward-extending pin $h^{10}$. On each frame $M^6$ (see, for example, Fig. 7) is a swinging wire-engaging dog $h^{11}$, which permits the wire Y to be drawn in the direction to the right in that figure and prevents its being drawn to the left. Mounted to slide in each frame $M^6$ is a block $h^{12}$, carrying a swinging dog or wire-gripper which grips the wire and moves it when the block is moved to the right in Fig. 7 and releases the wire when the block is moved to the left in that figure. On the side of the block $h^{12}$ opposite that at which it carries the dog is a lug $h^{13}$. The lug $h^{13}$ projects between a pair of pins $h^{10}$, the latter being so adjusted that one strikes the lug $h^{13}$ and moves the block $h^{12}$ when the bar $M^{11}$ is moved in one direction and the other strikes the lug and moves the block $h^{12}$ when the bar $M^{11}$ is moved in the opposite direction.

Mounted upon a frame N (see Fig. 3) at one side of the machine are supplying-reels N' for the staple-wires Y. A separate reel N' and separate staple-wire Y is provided for each staple-forming and driving machine. The wire Y from a reel is passed under the dogs $h^{11}$ and the dog on the block $h^{12}$ and through the guide-openings $m^{14}$ in the block $m^{12}$. In the rise of the cross-head F to the position shown in Fig. 9 the bar $M^{11}$ is pushed to the right in that figure, or to the left in Fig. 7. In the descent of the cross-head F the bar $M^{11}$ is moved to the left in Fig. 9, or to the right in Fig. 7. In the first of said movements a finger or pin $h^{10}$ moves the block $h^{12}$ to the left in Fig. 7, and in the second said movement a finger $h^{10}$ moves the block $h^{12}$ to the right in Fig. 7, causing its dog to engage the wire Y and advance it through the guide-slots $m^{14}$, $i^4$, and $m^8$ behind the driving-bar $M^4$, which is then down, as shown. The dog $h^{11}$ grips the wire and holds it against retraction while the block $h^{12}$ is moving to the left in Fig. 7. As the wire Y is advanced through its guides it is directed at its free end into a recess $m^{17}$ in the lower end of a stationary guide-piece $m^{18}$, fastened against the plate M', as shown, for example, in Figs. 7 and 12. The gearing of the mechanism is so timed that just as the wire Y is advanced to the position shown, for example, in Fig. 12 the forming-bar $M^3$ rises to a point wherein its cam projection $l^3$ strikes the cam projection $i^{11}$ on the cam-block $M^{10}$ and turns the latter to force the block $M^7$ down against the resistance of its spring $i^8$, and also the knife $M^8$ and pivotal block $i$ carried thereby. In the descent of the block $i$ its guide-groove $i^4$ acts as a cam to press the wire closely against the part or cutting edge $m^{19}$, Figs. 10 and 12, of the block $m^{12}$, so that in the further descent of the block $M^7$ the knife shears the wire in a manner to produce a bevel or pointed end. The cam projection $l^3$ wipes past the cam-block $M^{10}$, permitting the spring $i^8$ to raise the block $M^7$ and its attendant parts. In the upward movement of the cross-head which is taking place at this time the lower end of the driver rises past the cam-surface $m^{10}$ and permits the block $M^5$ to spring outward and force the wire Y where it passes through the guide $m^8$ outward into the path of the T-groove $l'$ in the forming-bar $M^3$. While the cross-head F is still moving upward to the limit of its rise, the cross-head G starts downward and engages the top of the bar $M^3$ to plunge the latter downward past the position shown, for example, in Fig. 15, to engage and bend the wire Y at its center over the mandrel $m^9$. The prongs of the staple rest in the sockets forming the opposite sides of the T-groove in the forming-bar, as shown, for example, in Fig. 16. Following this action the staple-driver $M^4$ descends, engages at its end $k^3$ the top of the staple, and forces the latter downward and out of the forming-bar, as shown in Fig. 17. As the staple-driver descends to the staple its lower end engages the cam-surface $m^{10}$ of the mandrel-block or plunger $M^5$ and forces the latter inward against the resistance of the spring $m^5$ to the position shown in Figs. 12 and 18. Thus before the driver strikes the staple the mandrel is pushed out of the way and releases the staple. While the cross-head F is nearing the limit of its plunge in the downward direction, the cross-head G commences to rise. Owing to the fact that the groove $m^2$ in the cross-head G is wider than the shoulder $l^2$ on the bar $M^3$ there is sufficient lost motion between the parts to cause the cross-head to engage and lift the forming-bar only after the staple-driver has been plunged the full limit in the downward direction. Thus the bar $M^3$ remains as a guide for the staple until the latter has been driven, as shown in Fig. 17. The yielding block $i$ and the recess $m^{17}$ in the guide-block $m^{18}$ operate to prevent the wire Y from springing outward while it is being formed into a staple Y'. In the event that the block $M^7$ should for any reason stick and be prevented from rising under the resilient action of the spring $i^8$ the stop projection $i^4$ on the bar $M^3$ will engage the lower end of the screw $i^{13}$ and slide the block $M^7$ upward to its normal position. The size of the staples Y' may be changed as desired. To form a longer staple, for example, the blocks $h^9$ are adjusted upon the bar $M^{11}$ so that a pin $h^{10}$ will have a longer engagement with the respective lug $h^{13}$, and thus move the block $h^{12}$ farther and feed more wire, and the adjusting-screw $m^{13}$ is turned to move the cutter-block $m^{12}$ farther away from the mandrel $m^9$. The adjustment by means of the screw $m^{13}$ should always be such that the mandrel $m^9$ will be midway of the length of the wire which is severed. To produce a shorter staple, the blocks $h^9$ are adjusted to effect a shorter engagement of the pins $h^{10}$ with the lug $h^{13}$ in each operation and feed less wire, and the cutter-block $m^{12}$ is moved, by means of the adjusting-screw $m^{13}$, correspondingly nearer to the mandrel.

The intermittent feed mechanism for the sheet and cleats is so geared with relation to the staple-drivers that in the descent of the cross-head G, during which time a staple is formed, as described, the lever $L^3$ is swung downward to cause the pawl $L^7$ to turn the ratchet-wheel L' and attendant gears and feed-chains to advance the sheet and cleats the desired distance. This distance may be varied by changing the adjustment of the connecting-rod $L^8$ in the slot $q'$ of the lever $L^3$. The staples are driven during the initial rise of the cross-head G, the driving operation being completed when the said cross-head engages and commences to raise the forming-bars $M^3$. With the initial rise of the cross-head G the pawl $L^7$ releases the ratchet-wheel $L^5$ to stop the feed. Thus the intermittent feed alternates in its action with the staple-drivers and causes the sheet Z and cleats Z' to remain stationary while staples are being driven.

Forming a part of each pair of brackets H² where the latter rests upon the stationary bar A¹¹ is an anvil-block P. The block is steadied in position by the bracket $p'$, which extends under the bar A¹¹ and carries a set-screw $p^5$, which is tightened against the said bar, as shown. Fastened upon the bar A¹¹ between the anvils are forward-projecting brackets P' (see Figs. 5 and 6) for the under side of the sheet Z. In the top of each anvil P is a groove $f$ (see Figs. 30 and 31) in the plane of the adjacent cleat-guide and through which the cleat slides. The anvils take the impact when staples are driven.

When it is desired to form a blank like that shown in Figs. 35 and 36, without an intermediate cleat, the intermediate strengthening-wire must be stapled to the sheet and clenched on the under side of the latter. For this purpose I provide a vertical opening $f'$ through each anvil and a clencher Q at the staple-driver where no cleat is to be fed, consisting of a bar Q', provided on its upper end with a collar $Q^2$ and downwardly-projecting bearing-plate $Q^3$. The bar Q' fits the opening $f'$ and the collar $Q^2$ and plate $Q^3$ rest upon parts of the anvil to steady and position the clencher. The parts may be fastened in place by means of a set-screw $Q^4$, as shown in Fig. 31. In the upper end of the bar Q' are upsetting-sockets $f^2$, as shown in Figs. 31 and 32, which receive the points of the staples as they are driven and upset and clench them, as shown in Fig. 37.

The strengthening-wires $Z^2$ in the formation of each blank are initially fed beneath the staple forming and driving bars centrally of the latter to extend beyond the end of the sheet and cleats and be in a position to be straddled by the staples as they are driven. When the first staples have been driven, the strengthening-wires will be drawn along with the material intermittingly, and therefore only initial feeding mechanism for the strengthening-wire is provided. This mechanism will be next described.

On the shaft D is a loose pulley D', which in practice is belted to a suitable drive-shaft and rotated constantly. The pulley and shaft are provided with companion clutch members of the same construction as the clutch upon the shaft C, before described. The clutch-shipping mechanism comprises a rock-shaft $D^2$, journaled toward opposite ends in the cheeks and carrying beyond the cheek $A^6$ (see, for example, Figs. 1 and 4) a crank $D^3$, which is pivotally connected to the lower end of a rod $D^4$, connecting at its upper end with a clutch-shipping bell-crank lever $D^5$.

On the rock-shaft $D^2$, beyond the cheek $A^7$, is an arm $D^6$, at its end affording a cam which projects into the path of a pin $D^7$, carried by the ratchet-wheel L'. On the cheek $A^6$ and connected at its lower end with the crank $D^3$ is a spring $D^8$, which tends normally to raise the crank $D^3$ and rod $D^4$ and produce disengagement between the clutch members. It will be understood that disengagement of the clutch members is produced by inward pressure upon the push-pin $a$, (indicated by dotted lines in Fig. 1,) and engagement of the clutch members is brought about by releasing the push-pin $a$. As this is a common construction and is only one of many forms of clutch which might be employed in this connection, detail illustration of the working parts is thought to be unnecessary. The spring $D^8$ operates to raise the rod $D^4$ and press the bell-crank lever $D^5$ into the path of the pin $a$, whereby the said pin is pressed inward and the pulley D' rotates idly upon the shaft.

In operation when the pin $D^7$ on the ratchet-wheel strikes the arm or cam $D^6$ it rocks the shaft $D^2$ to swing down the crank $D^3$ against the resistance of the spring $D^8$ and draw the rod $D^4$ downward to swing the bell-crank lever $D^5$ out of engagement with the pin $a$, whereby the latter springs in the outward direction and produces engagement between the clutch members and the shaft D is revolved by the pulley D'. As soon as the pin $D^7$ wipes past the cam $D^6$ the parts are turned by the spring $D^8$ to normal position, whereby when the pin $a$ arrives at the lever $D^5$ it is depressed and the shaft D stops. Thus the said shaft is given but one revolution with each operation.

Carried by the shaft D near one end adjacent to the cheek $A^7$ is an eccentric $D^9$, and the shaft is provided between the cheeks with a longitudinally-extending spline or feather $D^{13}$. (See Fig. 5.) Below the shaft D and journaled at opposite ends in the cheeks is a rock-shaft $D^{10}$, having a crank-arm $D^{11}$, connected by means of a connecting-rod $D^{12}$ with the eccentric $D^9$. Extending parallel with the shaft D is a rock-shaft R, journaled at opposite ends in the cheeks in the positions shown. Extending between the cheeks parallel with and just back of the bar $A^{10}$ is a rod $A^{13}$. Fastened against the back plate M' of each staple forming and driving device is a sleeve R', provided with a perforated ear $R^2$, which receives and slides upon the rod $A^{13}$, the latter operating as a supporting-guide to steady the sleeve and at the same time permit its adjustment with the staple forming and driving device. Extending through and journaled in the sleeve R' is a rock-shaft $R^3$, provided in one side with a gradually-reduced wire-guiding slot $e$, (see Fig. 18,) the end of the slot nearest the staple forming and driving device being reduced nearly to the diameter of the strengthening-wire $Z^2$. The said end of the slot is just back of the path of the center of the staple-driver, so that a wire $Z^2$ passed through the guide-slot $e$ will be in position to be straddled by staples as they are driven. Fastened against the end of the sleeve and extending part way across the end of the rock-shaft $R^3$ is a stationary knife $R^4$, Figs. 7 and 18. On the opposite end of the rock-shaft $R^3$ is a crank-arm $R^5$, pivotally connected at its free end portion with an upwardly-extending rod $R^6$. Adjustably fastened upon the rock-shaft R are backward-extending arms $R^7$, (see Fig. 5,) which correspond in number with the staple forming and driving devices. In the under side of each arm $R^7$ where it rests upon the shaft D, as shown, is a recess affording an abrupt shoulder $e'$. A spring $e^2$, fastened for convenience at one end to the shaft $D^{10}$, connects at its upper end with one of the arms $R^7$ and tends to press all the said arms downward upon the shaft D. On the shaft D' and adjustable longitudinally thereon are brackets S, each formed with two arms $S'$ $S^2$. The brackets S correspond in number with the staple forming and driving devices, and the arm $S'$ of each carries a reel $S^3$ for a length of strengthening-wire $Z^2$. Each arm $S^2$ carries a gripping-dog $S^4$, as shown, for example, in Fig. 2. The dog $S^4$ grips the wire $Z^2$ when the bracket is rocked in the downward direction, as hereinafter described, and releases the said wire when the bracket is rocked in the upward direction. On the end of each sleeve $R'$ is a pivotal dog $e^3$, (see Fig. 18,) which grips the wire $Z^2$ under any strain of the latter in the reverse direction and prevents its being withdrawn from the guide $e$ without interfering with its advancement through the said guide. Fastened at opposite ends, respectively, to the shaft R and reels $S^3$ are springs $S^5$, which tend to maintain the reels and brackets S raised.

In operation when the pin $D^7$ on the ratchet-wheel $L^5$ wipes across the arm or cam $D^6$ and turns the latter, as described, the drive-pulley D' clutches the shaft D and causes the latter to rotate. In its rotation its feather $D^{13}$ operates as a cam to raise the arms $R^7$ and through the rods $R^6$ and cranks $R^5$ to turn the rock-shafts $R^3$ across the knives $R^4$, thus severing the wires $Z^2$. This severing takes place in practice just after the end of a completed blank has passed from beneath the staple forming and driving devices, whereby the wires left upon the blanks extend, say, two inches beyond the rear edge of the blank. Immediately following this severing operation the spline on the shaft D passes the abrupt shoulders $e'$ of the arms $R^7$, causing the spring $e^2$ to pull down the arms by rocking the shaft R, and thus turn the rock-shafts $R^3$ to their initial positions, wherein the ends of the guide-openings $e$ are clear of the knives $R^4$. The shafts are so geared together that just as the rock-shafts $R^3$ return to their initial positions the shaft $D^{10}$ is rocked by the eccentric $D^9$ to swing the brackets S downward and force the wires $Z^2$ forward through the guides $e$, whereby the ends of the wires will project, say, three inches beyond the staple-drivers. In the last half of the rotation of the shaft D the brackets S and reels are swung upward again to normal position, the wires $Z^2$ being held against retraction by the dogs $e^3$.

Journaled at opposite ends in the cheeks in the positions shown are shafts V V'. Beyond the cheek $A^7$ the shaft V carries a gear-wheel $V^2$, which meshes with the gear-wheel L', and beyond the cheek $A^6$ the same shaft carries a gear-wheel $V^3$, which meshes with a similar gear-wheel $V^4$ on the shaft V'. Feathered upon the shaft V are feed-rollers $V^5$, and feathered upon the shaft V' are feed-rollers $V^6$. The rollers $V^5$ $V^6$ form companion feed-rollers the bites of which are in the plane of the sheet Z as the latter passes backward from the staple forming and driving devices. The shaft V' is journaled at opposite ends in vertically-movable boxes $V^7$ in the cheeks, whereby the upper feed-rollers have slight vertical play. Fulcrumed upon the inner sides of the cheeks and resting normally upon the shaft V' are levers $V^8$, provided upon their free ends with weights $V^9$, which tend to press the feed-rollers $V^6$ downward upon the feed-rollers $V^5$. The speed of rotation of the rollers $V^5$ $V^6$ at their peripheries corresponds with that of the feed-chains, and the said rollers assist the feed-chains in advancing the material beneath the staple-drivers and discharge the completed blanks from the machine.

In order, as before stated, that staples may not be driven at points along the sheet and cleats where step miter-cuts are afterward to be made, I provide skipping mechanism which operates to accelerate the action of the intermittent feed mechanism when those points pass the staple-drivers.

The skipping mechanism will be next described. In the outer side of the ratchet-wheel L', near its periphery, is an annular groove $d$, T-shaped in cross-section. T T are segmental plates, each formed of two relatively-sliding overlapping sections $d'$ $d^2$, whereby they may be lengthened and shortened as desired. Each section is upon a bolt $d^3$, having a head which fits and slides in the T-groove $d$. All the segmental plates may be extended to fill out the circumference of the ratchet-wheel, and at their peripheries they project slightly beyond the circumference of said wheel, as shown, for example, in Figs. 25 and 26. The plates may be contracted by sliding their sections upon each other to open spaces between the plates at any desired points around the ratchet-wheel. Journaled upon the sleeve $L^2$ is an arm T', pivotally connected at its free end with the lower end of a reciprocal rod $T^2$, which at its upper end is pivotally and adjustably connected with the lever $L^3$ at the slot $q'$ in the latter. The connection between the rod $T^2$ and lever $L^3$ is near the free end of the latter. The arm T' carries a dog $T^3$, which rides upon the periphery of the segmental plates T and at the spaces between said plates drops into engagement with the teeth of the ratchet-wheel $L^5$. The sheet and cleat engaging stops H⁶ on the feed-chains are farther apart than the length of the longest blank which the machine is adapted to make, and the gearing between the ratchet-wheel L⁵ and feed-chains is such that the said wheel performs a complete revolution to move the feed-chains a distance equal to the distance between two of their stops H⁶.

The adjustment of the skipper mechanism is effected in the following manner: Presuming, for example, that the box to be ultimately made is to be two feet square, cleats Z' a trifle over eight feet long and a sheet of corresponding length would be fed to the machine. The segmental plates T would then be adjusted upon the ratchet-wheel to leave open spaces $c$ at points to be engaged by the pawl T³ at the end of every two feet of travel of the material when it is engaged and advanced by the stops H⁶ after the material has been positioned by the sheet striking the tripping-lever B¹², as before described. Thus in the reciprocation of the rod T² and pawl T³ each time the pawl strikes into an open space $c$ and engages the ratchet-wheel L⁵ the latter will be moved by the said pawl. Owing to the fact that the rod T² is fastened toward the free end of the lever L³, its plunge is correspondingly greater than the plunge of the rod L⁸ and pawl L⁷, which normally operate the intermittent feed. Therefore each time the pawl T³ engages the ratchet-wheel the latter is moved, say, twice the normal distance, and thus feeds the sheet and cleats twice the distance between operations of the staple-driving devices. This causes the points at which the step-miter cuts are to be made to be skipped, as indicated in Figs. 35 and 36, no staples being driven thereat. The pin D⁷, before described, upon the ratchet-wheel is adjustable in a T-slot $d^4$ therein and may be shifted to any desired position and tightened. The said pin is adjusted to strike the lever D⁶ and operate the strengthening-wire cutters and feeders when the blank has passed a predetermined distance beyond the staple forming and driving devices.

After the strengthening-wires have been cut it is necessary to stop the machine preparatory to feeding the next cleats and sheet. The stopping of the drive-shaft C is effected by means of a pin $b$ (see, for example, Fig. 25) on one of the segmental plates T, which in the rotation of the ratchet-wheel and segmental plates thereon strikes the lever E⁹ and releases the rod E³, whereby it is drawn downward by its spring and moves the arm E' into the path of the pin $x$ at the clutch members between the shaft C and its driving-pulley C'. The pin $b$ may be adjusted to any desired position by proper adjustment of the segmental plate which carries it and should be in a position to bring about movement of the arm E' into the path of the pin $x$ in such a manner that there will be sufficient after-rotation of the shaft C before stopping to move the staple forming and driving devices upward out of engagement with the blank material and wipe the pin $b$ past the lever E⁹.

What I claim as new, and desire to secure by Letters Patent, is—

1. In a machine for forming box-blanks, the combination with sheet and cleat guides and tacking devices, of intermittent feed mechanism for the sheets and cleats geared with relation to the tacking devices to advance the sheet and cleats intermittingly while the tacking devices are in operation, preliminary-feed-operating mechanism comprising gear mechanism which may be thrown at will into operative engagement with the said intermittent feed mechanism to advance the sheet and cleats in their guides to the tacking devices, and preliminary-feed-disengaging mechanism actuated by the advance of the blank material to the tacking devices to stop the preliminary feed, substantially as and for the purpose set forth.

2. In a machine for forming box-blanks, the combination with sheet and cleat guides and tacking devices, of feed-belts at the guides for the sheet and cleats, geared with relation to the tacking devices to advance the sheet and cleats intermittingly while the tacking devices are in operation, preliminary-feed-operating mechanism comprising gear mechanism which may be thrown at will into operative engagement with the feed-belts to advance the sheet and cleats in their guides to the tacking devices, and preliminary-feed-disengaging mechanism actuated by the advance of the blank material to the tacking devices to stop the preliminary feed, substantially as and for the purpose set forth.

3. In a machine for forming box-blanks, the combination with feed and cleat guides and tacking devices, of feed-wheels toward opposite ends of said guides, endless belts on said wheels provided with sheet and cleat engaging projections, a gearing between said wheels and the tacking devices operating when the tacking devices are actuated to advance the belts with the sheet and cleats intermittingly, preliminary-feed-operating mechanism comprising gear mechanism which may be thrown at will into operative engagement with the wheels to move the feed-belts and advance the sheet and cleats in their guides to the tacking devices, and preliminary-feed-disengaging mechanism extending into the path of the blank material at the tacking devices, substantially as and for the purpose set forth.

4. In a machine for forming box-blanks, the combination with sheet and cleat guides and tacking devices, of shafts toward opposite ends of said guides carrying belt-wheels, endless belts extending around said wheels, along the guides and carrying sheet and cleat engaging projections, a gearing between the tacking devices and belt-wheel shafts operating when the tacking devices are actuated to turn said shafts intermittently, an independent drive-shaft, lever mechanism movable at will to throw said drive-shaft into operative engagement with the belt-wheel shafts to advance the sheet and cleats in their guides to the tacking devices, and a said lever-mechanism-releasing stop in the path of the blank material to be engaged thereby and actuated to cause said lever mechanism to release engagement between the drive-shaft and belt-wheel shafts when the material reaches the tacking devices, substantially as and for the purpose set forth.

5. In a machine for forming box-blanks, the combination with intermittent feed mechanism for the blank material, of a drive-shaft, cross-heads operatively geared to the drive-shaft at different angles with relation to said shaft, a staple forming and driving device, adjacent to the path of the blank material having a staple-forming bar and a staple-driver coöperating with the forming-bar and geared to one said cross-head, the staple-forming bar being actuated from the other said cross-head to be moved thereby during a part only of the movement of the cross-head, whereby when the staple is formed the forming-bar will remain in one position while the staple-driver is moved to discharge the staple therefrom, a staple-wire feeder adjacent to the forming-bar, and means for guiding a strengthening-wire, substantially as and for the purpose set forth.

6. In a machine for forming box-blanks, the combination of a drive-shaft, cross-heads operatively geared to the drive-shaft, a staple forming and driving device, adjacent to the path of the blank material having a staple-forming bar operatively geared to one said cross-head, and a staple-driver coöperating with the forming-bar and geared to the other said cross-head, a staple-wire feeder adjacent to the forming-bar, a staple-wire cutter actuated in the rise of the forming-bar, a movable mandrel across which staple-wire is fed and over which the forming-bar descends to form the staples, the said mandrel being normally in the path of the staple-driver, means for moving the mandrel out of the path of a staple-driver in the descent thereof, means for guiding a strengthening-wire adjacent to the staple forming and driving device, and intermittent feed mechanism for the blank material operatively geared to the said drive-shaft, substantially as and for the purpose set forth.

7. In a machine for forming box-blanks, the combination with feed mechanism for the blank material, of a drive-shaft, cross-heads operatively geared to the drive-shaft, a staple forming and driving device adjacent to the path of the blank material, having a staple-forming bar operatively geared to one of said cross-heads, and a staple-driving device coöperating with the forming-bar and geared to the other said cross-head, a staple-wire feeder adjacent to the forming-bar, a guide for a strengthening-wire, adjacent to the staple forming and driving device, through which the strengthening-wire is drawn by movement of the blank when fastened to the blank, strengthening-wire feeding and severing mechanisms, and means for operating the same only when the end of the blank passes from beneath the staple forming and driving device, substantially as and for the purpose set forth.

8. In a machine for forming box-blanks, the combination of a drive-shaft, a staple forming and driving device adjacent to the path of the blank material operatively geared to the drive-shaft, intermittent feed mechanism for the blank material having a ratchet-wheel and a reciprocating pawl actuated from the drive-shaft to turn the ratchet-wheel once with each reciprocation, and skipper mechanism comprising segmental plates upon the ratchet-wheel projecting beyond the ratchet-teeth, a reciprocating pawl actuated from the drive-shaft and riding normally upon said plates and engaging the ratchet-wheel between the ends of said plates only, all constructed to operate substantially as and for the purpose set forth.

9. In a machine for forming box-blanks, the combination of the main drive-shaft, a constantly-rotating pulley upon said shaft, clutch mechanism between the shaft and pulley, clutch-operating mechanism, an operating-lever for said clutch-operating mechanism movable to produce engagement between the clutch members to cause the shaft to be rotated by the pulley, tacking devices geared to said main shaft, a second drive-shaft, feed mechanism for the blank material, an operating-lever movable to throw the feed mechanism into engagement with said second drive-shaft to move the blank material to the tacking devices, means for disengaging the feed mechanism from the said second drive-shaft in the path of the blank material and operating to produce such disengagement when the material arrives at the tacking devices, intermittent feed mechanism for the blank material having a ratchet-wheel and a driving-pawl for said ratchet-wheel reciprocated from the main drive-shaft, and a stop movable with the ratchet-wheel to engage the said clutch-operating mechanism and release the clutch members at the main drive-shaft, substantially as and for the purpose set forth.

10. In a machine for forming box-blanks, the combination with the main drive-shaft C, a tacking device and pawl and ratchet-wheel intermittent feed mechanism for the blank material actuated from the drive-shaft, of a shaft D, rotating means for said shaft normally out of engagement therewith, a guide for a strengthening-wire at said tacking device, strengthening-wire feed and severing mechanisms adjacent to said guide and operatively geared to the shaft D, a stop movable with the ratchet-wheel, and clutch mechanism between the shaft D and its rotating means, projecting into the path of said stop, whereby in each rotation of the ratchet-wheel the shaft D is actuated to actuate the strengthening-wire feed and severing mechanisms, substantially as and for the purpose set forth.

11. In a machine for forming box-blanks, the combination with intermittent feed mechanism for the sheet and cleats and the staple forming and driving devices, of an anvil beneath each said device to take the impact against a cleat, and a removable staple-clencher with means for securing it to one of said anvils, substantially as and for the purpose set forth.

12. In a machine for forming box-blanks, the combination with intermittent feed mechanism for the blank material, of a drive-shaft, a staple forming and driving device geared to said drive-shaft, comprising a staple-forming bar, a staple-driving bar and means for feeding the staple-wire, of a cutter-block adjacent to the path of the forming-bar, a guide-opening through said cutter-block at an angle to the face of said block, a cutter-knife working across said face, a movable mandrel in the path of the driving-bar, and means for guiding the wire from the cutter-block across the mandrel and beneath the forming-bar comprising a yielding block $i$, provided with a guide-opening $i^4$, movable with the cutter-knife, substantially as and for the purpose set forth.

FREDERICK P. ROSBACK.

In presence of—
J. H. LEE,
R. T. SPENCER.